US008947852B2

(12) United States Patent
Jones et al.

(10) Patent No.: US 8,947,852 B2
(45) Date of Patent: Feb. 3, 2015

(54) INTEGRATED EMI FILTER AND SURGE PROTECTION COMPONENT

(71) Applicant: Kemet Electronics Corporation, Simpsonville, SC (US)

(72) Inventors: Lonnie G. Jones, Simpsonville, SC (US); John Bultitude, Simpsonville, SC (US); Mark R. Laps, Simpsonville, SC (US); James R. Magee, Simpsonville, SC (US); Jeffrey W. Bell, Simpsonville, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 0 days.

(21) Appl. No.: 13/905,247

(22) Filed: May 30, 2013

(65) Prior Publication Data

US 2014/0198422 A1 Jul. 17, 2014

Related U.S. Application Data

(63) Continuation-in-part of application No. 13/541,853, filed on Jul. 5, 2012, and a continuation-in-part of application No. 13/542,007, filed on Jul. 5, 2012.

(60) Provisional application No. 61/505,791, filed on Jul. 8, 2011, provisional application No. 61/505,382, filed on Jul. 7, 2011, provisional application No. 61/505,390, filed on Jul. 7, 2011.

(51) Int. Cl.
*H01G 4/02* (2006.01)
*H01G 5/013* (2006.01)
(Continued)

(52) U.S. Cl.
CPC . *H02H 7/00* (2013.01); *H01G 4/30* (2013.01); *H01C 1/14* (2013.01); *H01C 7/12* (2013.01); *H01G 2/14* (2013.01); *H01G 4/005* (2013.01)
USPC ........................ 361/325; 361/278; 361/301.1

(58) Field of Classification Search
None
See application file for complete search history.

(56) References Cited

U.S. PATENT DOCUMENTS 6,346,871 B1 * 2/2002 Ogasawara et al. ............. 338/21
7,685,703 B1 * 3/2010 Devoe et al. .................... 29/840
(Continued)

FOREIGN PATENT DOCUMENTS

JP 2010-146779 A 7/2010
WO WO 97-26665 A1 7/1997
WO WO 2007-014302 A2 2/2007

OTHER PUBLICATIONS

International Search Report for PCT/US2012/045876, prepared by ISA/KR; Jan. 30, 2013.

*Primary Examiner* — Dion R Ferguson
(74) *Attorney, Agent, or Firm* — Joseph T. Guy; Perkins Law Firm, LLC

(57) ABSTRACT

An improved electronic component is described. The electronic component has a capacitor with first planer internal electrodes in electrical contact with a first termination and second planer internal electrodes in electrical contact with a second termination. A dielectric is between the first planer electrodes and the second planer internal electrodes. The electronic component further comprises at least one of:

an inductor comprising a conductive trace wherein said conductive trace is between the first termination and a third termination; and an overvoltage protection component comprising:

a third internal electrode contained within the dielectric and wherein the third internal electrode is electrically connected to the first termination;

a fourth internal electrode contained within the ceramic and electrically connected to a fourth termination; and a gap between the third internal electrode and the fourth internal electrode.

23 Claims, 26 Drawing Sheets

(51) Int. Cl.

| | |
|---|---|
| ***H02H 7/00*** | (2006.01) |
| ***H01G 4/30*** | (2006.01) |
| ***H01C 1/14*** | (2006.01) |
| ***H01C 7/12*** | (2006.01) |
| ***H01G 2/14*** | (2006.01) |
| ***H01G 4/005*** | (2006.01) |

(56) References Cited

U.S. PATENT DOCUMENTS

| | | | | |
|---|---|---|---|---|
| 2004/0042141 | A1 | 3/2004 | Mikolajczak et al. | |
| 2011/0002082 | A1 * | 1/2011 | Bultitude et al. | .......... 361/306.3 |

* cited by examiner

FIG. 7
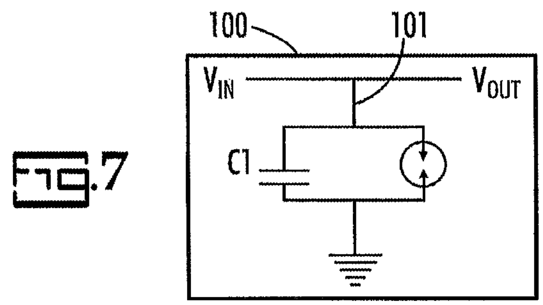
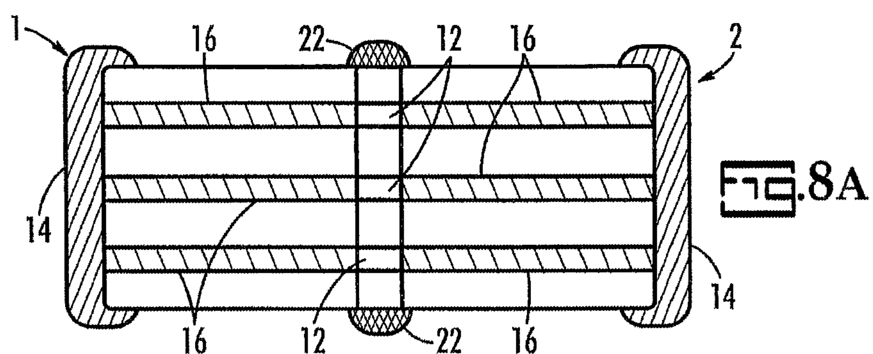
FIG. 8A
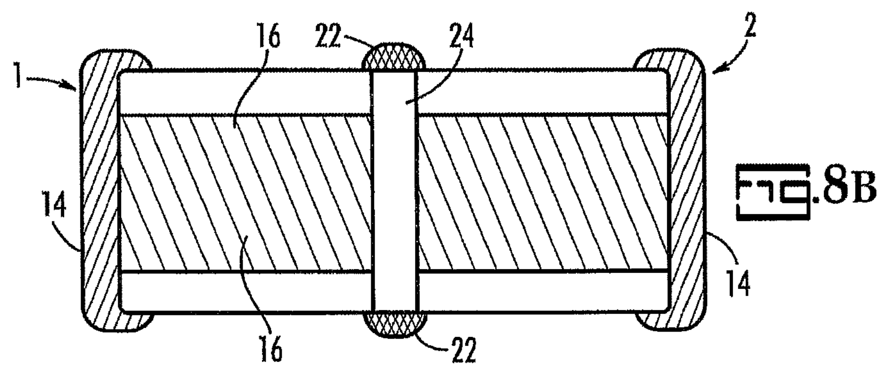
FIG. 8B
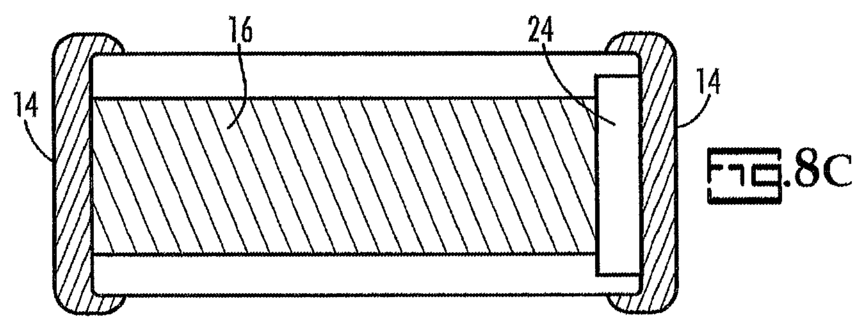
FIG. 8C

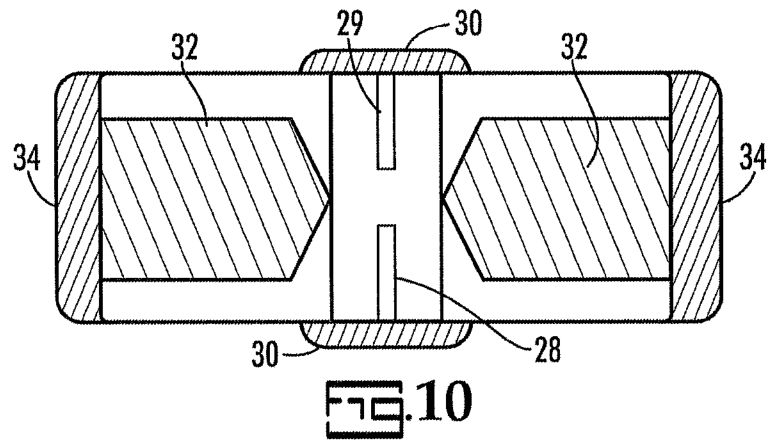
FIG. 10
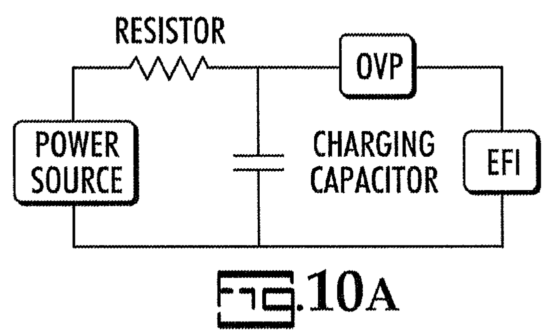
FIG. 10A
FIG. 11
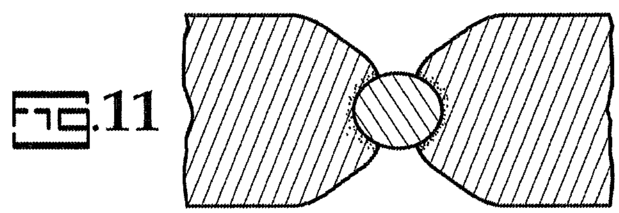

| MEAN | STDEV | N | AD | P |
|---|---|---|---|---|
| 0.000000709 | 0.000002210 | 10 | 3.208 | <0.005 |
| 0.000002811 | 0.000002328 | 10 | 0.487 | 0.171 |

| MEAN | STDEV | N | AD | P |
|---|---|---|---|---|
| * | * | 10 | * | |
| 0.00001531 | 0.00001719 | 10 | 0.728 | 0.039 |

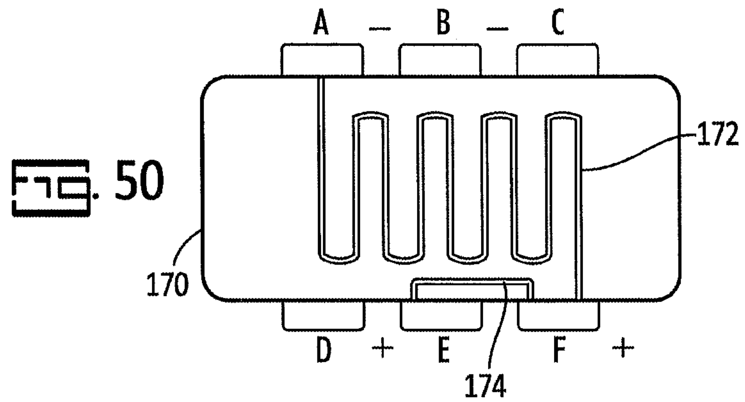
FIG. 50
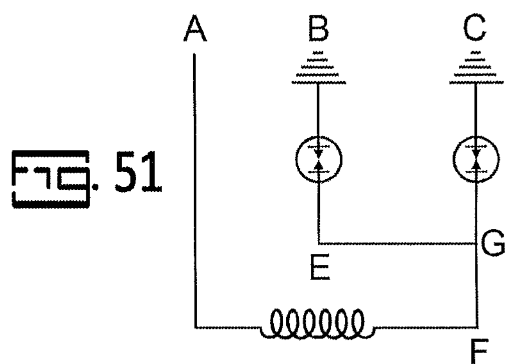
FIG. 51
FIG. 52
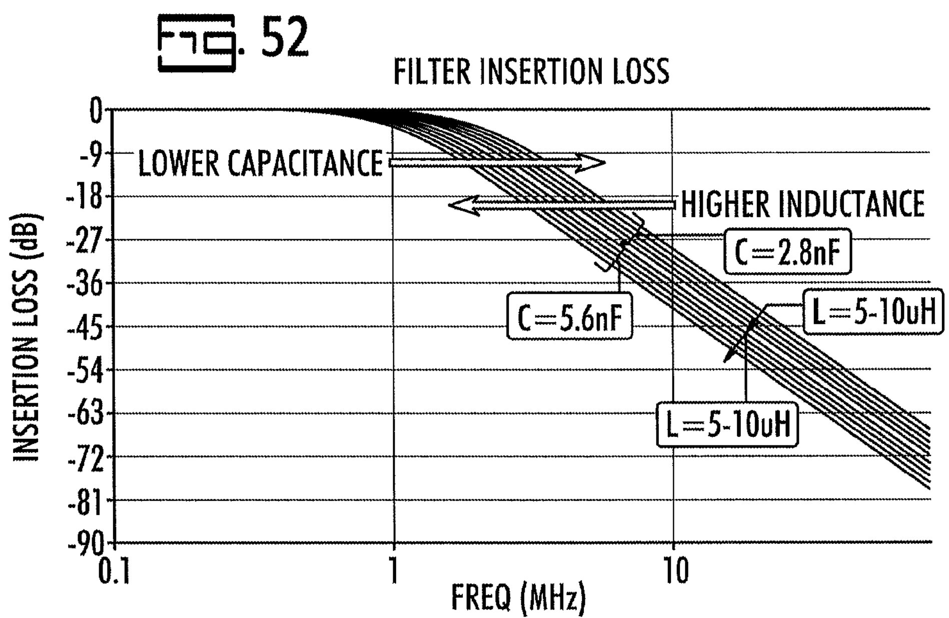

INTEGRATED EMI FILTER AND SURGE PROTECTION COMPONENT

CROSS-REFERENCE TO RELATED APPLICATIONS

This application is a continuation-in-part of pending U.S. patent application Ser. No. 13/541,853 filed Jul. 5, 2012, which, in-turn, claims priority to U.S. Provisional Patent Application No. 61/505,791 filed Jul. 8, 2011 each of which is incorporated herein by reference. This application is also a continuation-in-part of pending U.S. patent application Ser. No. 13/542,007 filed Jul. 5, 2012 which, in-turn, claims priority to U.S. Provisional Patent Application No. 61/505,382 filed Jul. 7, 2011 and U.S. Provisional Patent Application No. 61/505,390 filed Jul. 7, 2011 all of which are incorporated herein by reference.

BACKGROUND

Overvoltage protection is typically provided by voltage dependent resistors, such as Schottky diodes based on SiC, or varistors, based on ZnO, which work on solid state principles related to grain boundary conduction. The present invention is related to filters suitable for removing high frequency electromagnetic interference (EMI) from electronic signals whilst protecting the component and associated circuitry from voltage spikes or surges. More specifically, the present invention is related to multi-layered ceramic filters.

The most popular type of voltage dependent resistors, or varistors, are based on zinc oxide doped with other elements to control grain boundary conduction. These devices depend on their non-linear I-V behavior to suppress transient voltage surges. However, there are some significant compromises that result from their use. Voltage permanently applied to the varistor must be carefully limited to avoid excessive power dissipation. Since they often have a negative temperature coefficient of resistivity a runaway condition can easily be initiated. Subjecting varistors to electric fields can change the characteristic and result in an increase in current and power dissipated as heat, degrading performance.

Filtering of electronic signals is also a widely practiced art typically practiced with filters such as discoidal filters, Pi filters, T filters, LC filters and the like. In general, the type of filter is chosen based on the filtration needs and one of the most common needs is to filter EMI noise from signals.

Discoidal filters are commonly used where the discoidal filter is placed on the input line and contacted to ground. Placement of the filter is typically a manual operation which is not readily automated thereby significantly increasing the cost of devices containing discoidal filters. In the most demanding applications, such as on the leads of medical implantable devices, the leads must be hermetically sealed, typically in a can, and the can is grounded.

Surface mount filters are available which have some advantages over discoidal filters. Surface mount filters are typically 4 terminal capacitors with input and output terminals perpendicular to each other. This design dictates the relative location of the ground and signal traces which places a constraint on the circuit designer. The perpendicular design also complicates efforts to miniaturize the overall circuit size. As the components become smaller the distance between the signal and ground must be decreased to accommodate the filter terminations. Unfortunately, this increases the potential of arcing, particularly in high voltage applications. The perpendicular orientation also makes the use of slotted boards impractical and electromagnetic radiation interference mitigation is not typically available.

Pi, T, and LC filters are widely used in either feed-through or surface mount configurations. The surface mount filters are preferred over feed-through when considering further miniaturization even though the electromagnetic radiation interference mitigation is superior in the feed-through configurations. The surface mount configurations comprise a magnetic inductor and a ceramic filter and integrating these components is a significant challenge. The magnetic inductor is typically ferrite or ferromagnetic materials which are not compatible with the materials used in multi-layered ceramic capacitors due to the sintering requirements of ceramic.

There has been an ongoing desire for a filter which is small in dimension yet which does not increase complexity in circuit design. There has also been an ongoing desire for a filter which is easily manufactured, is preferably surface mountable or embeddable, and which can be adapted to various circuit requirements.

There has also been an ongoing desire for an overvoltage protection device which does not have the deficiencies of the prior art.

SUMMARY

It is an object of the present invention to provide a component that also functions as an overvoltage protection device.

It is a further object of the present invention to provide an overvoltage protection component that can be readily manufactured by similar methods currently used for multi-layer ceramic capacitors (MLCC).

A particular feature of the invention is that overvoltage protection can be realized that is surface mountable, can be produced in a miniaturized form and is suitable for large scale mass production.

It is a further object of the invention to provide a filter which can be integral to a capacitor and further overvoltage protection thereby providing multiple functions in a common component.

These and other advantages, as will be realized, are provided in an overvoltage protection component. The overvoltage protection component has a first internal electrode contained within a ceramic dielectric material. The first internal electrode is electrically connected to a first termination and a second internal electrode contained within the ceramic dielectric material is electrically connected to a second termination.

In another embodiment a gap is provided between the first internal electrode and the second electrode. Yet another embodiment is provided in an improved electronic device. The electronic device has a circuit with at least two traces. An overvoltage protection device is provide having a first internal electrode contained within a ceramic dielectric material and electrically connected to a first termination. A second internal electrode is contained within the ceramic dielectric material and electrically connected to a second termination. A gap is between the first internal electrode and the second electrode wherein the first termination is in electrical contact with a first trace. A second termination is in electrical contact with a second trace.

Yet another embodiment is provided by an improved electronic component. The electronic component has a capacitor with first planer internal electrodes in electrical contact with a first termination and second planer internal electrodes in electrical contact with a second termination. A dielectric is between the first planer electrodes and the second planer internal electrodes. The electronic component further comprises at least one of:

an inductor comprising a conductive trace wherein the conductive trace is between the first termination and a third termination; and an overvoltage protection component comprising:

a third internal electrode contained within the dielectric and wherein the third internal electrode is electrically connected to the first termination;

a fourth internal electrode contained within the ceramic and electrically connected to a fourth termination; and a gap between the third internal electrode and the fourth internal electrode.

BRIEF DESCRIPTION OF FIGURES

FIG. 7 is a schematic view of an embodiment of the invention.

FIG. 8A is a schematic cross-sectional view of an embodiment of the invention.

FIG. 8B is a schematic cross-sectional view of an embodiment of the invention.

FIG. 8C is a schematic cross-sectional view of an embodiment of the invention.

FIG. 10 is a schematic cross-sectional view of an embodiment of the invention.

FIG. 10A is an electrical schematic diagram illustrating an embodiment of the invention.

FIG. 11 is a schematic partial cross-sectional view of an embodiment of the invention.

FIG. 50 is a top perspective schematic view of an embodiment of the invention.

FIG. 51 is an electrical schematic representation of an embodiment of the invention.

FIG. 52 is a diagrammatic representation of an embodiment of the invention.

DETAILED DESCRIPTION

Figure 1:
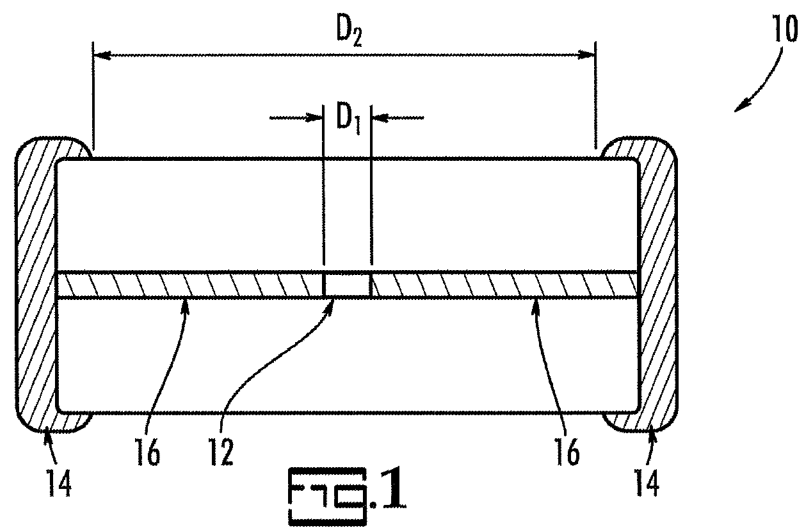
FIG. 1 is a schematic cross-sectional view of an embodiment of the invention.

The present invention is related to electronic components, with integral overvoltage protection and filtration, which can be surface mounted, manufactured using conventional manufacturing processes similar to the manufacture of multi-layered ceramic capacitors, and which have superior performance relative to prior art devices. More specifically, the present invention is related to a multi-layered ceramic filter based component with overvoltage protection characteristics which is easily manufactured and which avoids the sintering problems typically encountered in components comprising both a multi-layered ceramic capacitor and an integral inductor.

The invention will be described with reference to the figures which form an integral, non-limiting component of the instant disclosure. Throughout the description similar elements will be numbered accordingly.

The overvoltage protection device of the instant invention uses internal arcing to direct excessive overvoltage to ground and then the overvoltage protection device returns to the insulating state after the overvoltage condition. The overvoltage protection component relies on a different set of principles than the prior art to achieve overvoltage protection which allows for functionality enhanced performance and capability. Specifically, the overvoltage protection can be realized while eliminating loss of power which typically occurs when conventional devices are operated under a permanent bias voltage. Furthermore, rapid dissipation of excessive energy can be achieved.

A particular advantage of the present invention is the ability to provide multi-layer ceramic capacitors (MLCC) that can withstand very high electrostatic discharges (ESD) well beyond the limits of the prior art. These benefits will be apparent from the descriptions in the following sections.

A further advantage of the present invention is that it can also be used to provide a spark gap device that allows the electrical energy to be transmitted at a certain voltage such as in detonation circuits, also referred to as fuzes. In these cases the overvoltage protection component offers smaller, readily surface mountable solutions compared to other solutions such as gas discharge tubes typically used for this purpose. The technology described in this invention also allows the functionality of a spark gap to be combined with that of the charging capacitor currently employed in detonation circuits. These benefits will be apparent from the descriptions in the following sections.

The problem of protecting circuits from overvoltage is solved by an overvoltage protection device designed to internally arc through controlled gaps between electrodes of opposing polarity within the device. By arranging one or more gaps between opposed electrodes, the electrode metal, electrode shape, shape of the gap, the ceramic dielectric type, and the atmosphere present in the gaps can be arranged such that at a predetermined voltage arcing occurs to ground. Furthermore, by adjusting these parameters the time constant for arcing can be adjusted to match the ramp rate of the voltage transients expected in the circuit.

The capacitance can be adjusted such that if the stored energy at a given voltage is exceeded the excessive energy is dissipated through the internal arcing. Since the internal arcing occurs at a predetermined threshold voltage the circuit can function with a permanently applied voltage without dissipating power. Excess voltage is conducted to ground as electrical energy. Although significant localized heating within the device may occur during the internal arcing process this is a secondary effect of the electrical energy dissipation to ground unlike a varistor that primarily dissipates the energy through heat. Temperature resistant ceramic construction is therefore preferred.

In the overvoltage protection component an arc is formed at a predetermined voltage. The arc may be in air or other atmospheres. The gap in the overvoltage protection capacitor is preferably in a sealed environment with the resulting excess energy conducted away through heat or the opposing electrode to ground. The overvoltage protection component combines the spark gap principle with the materials and manufacturing methods used in MLCC manufacture to increase the scope and application voltages of these devices. Gaps are preferably formed between electrodes on the same plane between electrodes of opposite polarity. The overvoltage protection component of the present invention allows multiple spark gaps to be formed between electrodes of opposed polarity thereby increasing application voltage. Doping of the sacrificial material in the gap can be used to control the surface formed in the gap. Process methods can be used to control and introduce atmospheres other than air. Capacitance layers can be combined with the gaps as required to provide dual functionality.

An embodiment of the invention is illustrated in cross-sectional view in FIG. 1. In FIG. 1, the overvoltage protection component, generally represented at 10, comprises an internal gap, 12, between electrodes, 16, of opposing polarity. The electrodes are in electrical contact with terminals, 14, of opposing polarity. The internal gap has an arc distance, $D_1$, which must be less than the external distance, $D_2$, between terminals, 14, of opposed polarity in cases where the surfaces of the dielectric and atmosphere present are the same. The internal gap can be formed during the manufacture of the device using techniques familiar in multi-layer capacitor (MLCC) manufacture. Particularly useful techniques include printing sacrificial material between the electrodes, such as carbon or organic filled ink, that are removed during the co-sintering of the layers. Another technique includes making a hole in the tape between the electrode layers.

The surface condition within the internal gap is important in determining the creepage that corresponds to arcing across the arc distance at the threshold voltage. Different ceramic dielectric materials exhibit different creepage potentials so the threshold voltage at a given arc distance can be controlled. Paraelectric dielectrics, such as COG class materials, are far less prone to arcing than ferroelectric ceramics such as X7R or X5R class materials. In the case of printing of a sacrificial material doping with inorganic materials can be used to control the surface condition in the internal gap. Additions of ceramic particles may be made to the sacrificial material to retain the gap on processing. Alternatively, gaps may be left in the sacrificial print to allow ceramic to flow into the gap to form ceramic columns within the gap to retain the size and shape of the gap during subsequent processing wherein the column acts as a physical support between ceramic above and below the gap.

Another important factor with respect to controlling the threshold voltage is the electrode material. Metals with different work functions will exhibit different threshold voltages, with respect to arcing, over the same distance. Also the gas present in the internal gap and the energy required for ionization will also affect the threshold voltage.

Figure 2:
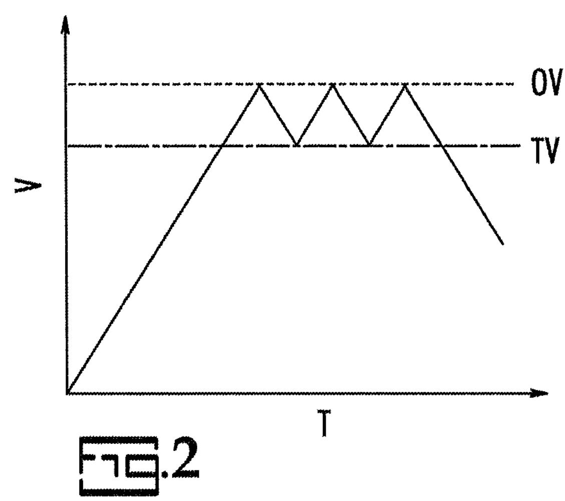
FIG. 2 is a diagrammatic illustration of an embodiment of the invention.

An advantage of the invention is illustrated in FIG. 2 wherein the function of the overvoltage protection component is illustrated in graphical view. In FIG. 2 voltage (V) as a function of time (T) is illustrated. Above an overvoltage condition (OV) internal arcing dissipates excess voltage to ground after which the voltage subsides below the threshold voltage (TV).

Figure 3:
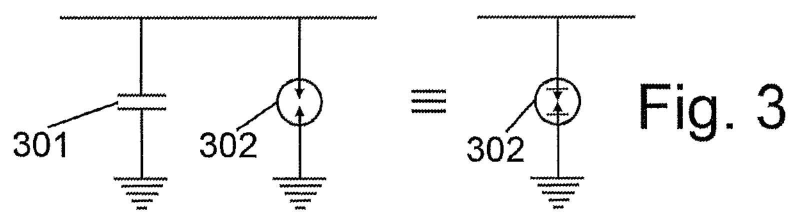
FIG. 3 is an illustration of an embodiment of the invention.

FIG. 3 illustrates the concept of a symbol used herein to represent the integrated capacitor and overvoltage protection device in schematic diagrams. The conventional symbols for a capacitor, 301, and a spark gap, 302, shown in FIG. 3 are combined into a symbol representing one integrated electronic component, 303, connected between a signal line and ground. If an overvoltage protection capacitor, illustrated by the symbol in FIG. 3, is inserted between an input voltage and ground, internal arcing occurs once the threshold voltage is exceeded, dissipating the excess energy to ground.

Figure 4:
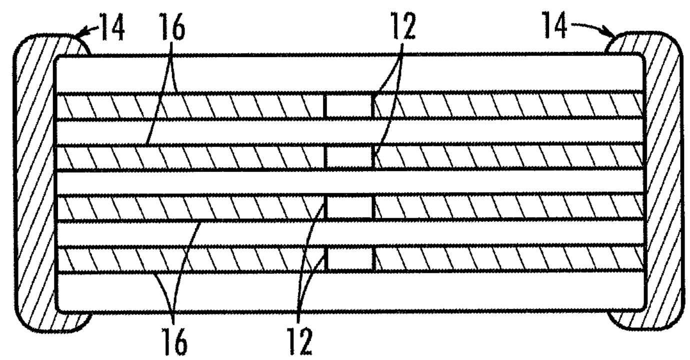
FIG. 4 is a schematic cross-sectional view of an embodiment of the invention.

An embodiment of the invention is illustrated in cross-sectional schematic view in FIG. 4. In FIG. 4 multiple layers of electrodes, 16, are provided with internal gaps, 12, in each. The electrodes are between external terminations, 14. This arrangement provides an overvoltage protection component which is capable of handling higher currents, and more energy, than a single layered overvoltage protection component.

Figure 5:
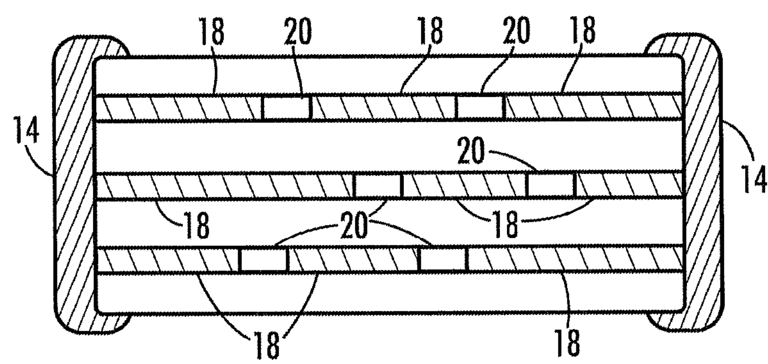
FIG. 5 is a schematic cross-sectional view of an embodiment of the invention.

An embodiment of the invention is illustrated in cross-sectional schematic view in FIG. 5. In FIG. 5, electrodes, 18, are provided with each electrode having multiple internal gaps, 20, within each electrode. The electrodes are between external terminations, 14. With multiple gaps in an electrode as shown in FIG. 5 the potential required to achieve internal arcing will be raised thereby increasing the threshold voltage above that for the component shown in FIG. 4.

Figure 6:
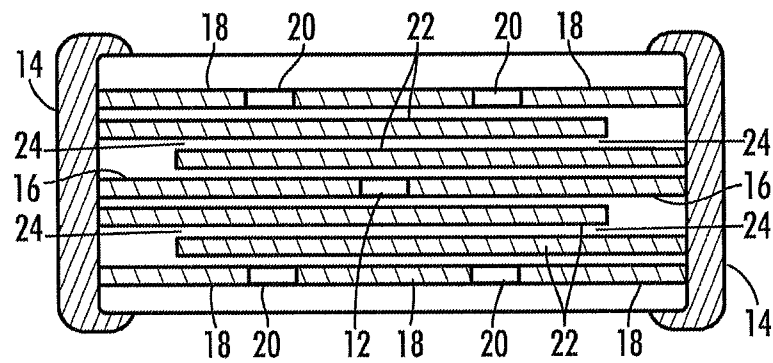
FIG. 6 is a schematic cross-sectional view of an embodiment of the invention.

An embodiment of the invention is illustrated in cross-sectional schematic view in FIG. 6 wherein dual functionality is provided. In FIG. 6 alternating capacitor electrodes, 22, of opposing polarity with an active dielectric, 24, at least between the capacitor electrodes provides a capacitive couple between the external terminations, 14. Overvoltage protection is provided by at least one electrode, 16, with a gap, 12, therein, or at least one electrode, 18, with multiple gaps, 20, therein. This embodiment achieves more capacitance with the energy stored in the active capacitor layers.

An electrical schematic diagram of an electronic device, 100, is illustrated in FIG. 7 wherein the device comprises a circuit, 101, with a device as illustrated in FIG. 6. In FIG. 7, a standard MLCC capacitor, C1, is in electrical parallel with an overvoltage protection component (OVP). When used to protect transmission circuitry a high capacitance capacitor is not desirable since this may result in signal distortion.

Gases can be used in the internal gaps to control the threshold voltage wherein the lower the ionization potential of the gas the lower the threshold voltage. It is therefore desirable, in some embodiments, to process overvoltage protection capacitors with a controlled gas atmosphere within the internal gaps. This can be achieved by controlling the process atmosphere during the co-sintering of the device or by forming the internal gap to the outside of the final device. Particularly preferred gases include atmospheric air or an inert gas selected from He, Ne, Ar, Kr or Xe. Nitrogen and hydrogen may also be used and mixtures of these gases can be employed to alter the breakdown and recovery of the device. Paschen's law states that the breakdown characteristics of a gap (V) are a function of the gas pressure (p) and the gap length (d); V=f(pd). For an air atmosphere and gaps of the order of 1 mm: V=30 pd+1.35 kV, where d is the gap length in cm and p is the air pressure in atmospheres. Most gases have a non-linear response with variation in pressure so mixtures are employed to tailor this for a given application. Pure inert gases are only preferred for high voltages. Other factors such as temperature, humidity and the secondary ionization potential can also affect the breakdown voltage. Vapors may also be introduced to the gap to act as replenishers, the best known of these is mercury vapor used extensively in fluorescent tubes but for gas discharge function the introduction of alcohol or halogen vapors can be beneficial since their high electronegativity and ability to absorb UV light can help dampen the discharge.

An embodiment of the invention is illustrated in schematic cross-sectional side view in FIG. 8A and in schematic cross-sectional top view in FIG. 8B. In FIGS. 8A and 8B the electrodes, 16, between external terminations, 14, have gaps, 12, which are within a channel, 24, wherein the channel is accessible to the outside of the capacitor body. A gas is entered into the channel and a gas tight seal, 22, is placed over the opening of the channel thereby securing the gas within the chamber.

An embodiment of the invention is illustrated in schematic top view in FIG. 8C. In FIG. 8C the gap is between the terminal, 14, and inner electrode, 16. This embodiment avoids the additional process necessary to add gas tight seals. The external termination itself functions to seal the gas within the gap. Suitable termination materials would not flow into the gap since the distance must be controlled to insure arcing at a defined threshold voltage and the termination would have to be applied in the gas atmosphere required. Suitable termination materials include conductive adhesives, TLPS conductive adhesives, glasses and metal or metal glasses. These may be applied in a number of ways and forms that are known in the prior art. One preferred method is to apply as a thick film paste that can be rapidly cured to form a gas tight seal.

Figure 9:
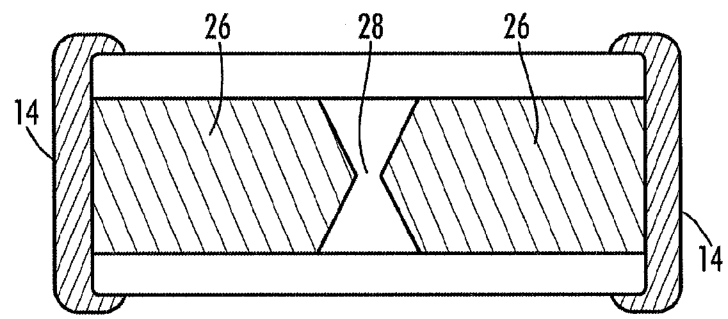
FIGS. 9, 9A and 9B are schematic cross-sectional views of embodiments of the invention.
Figure 9A:
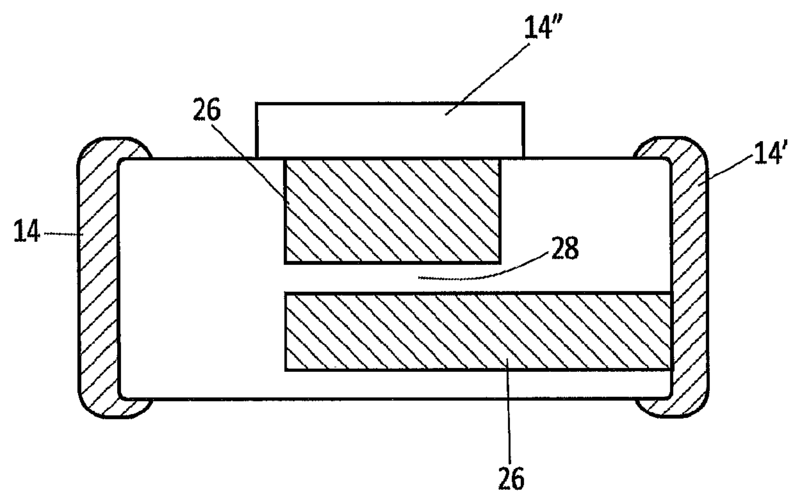
Figure 9B:
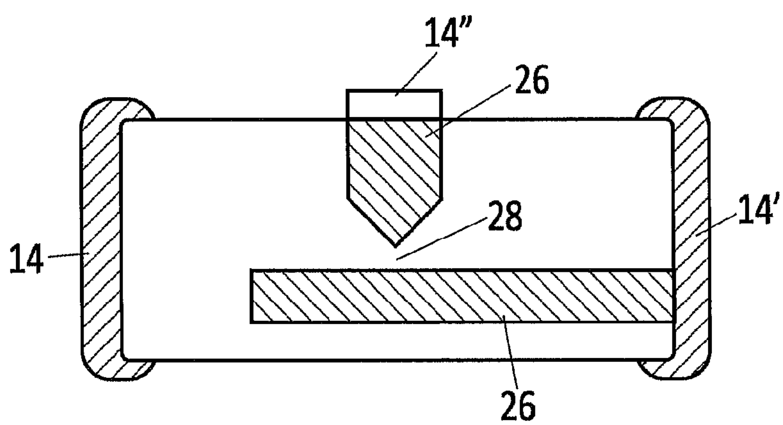

An embodiment of the invention is illustrated in schematic top cross-section view in FIG. 9. In FIG. 9 at least a portion of the inner electrodes, 26, converge thereby concentrating charge at a narrow portion of the closest approach of opposing electrodes at the narrowest portion of the gap, 28. By concentrating the charge at the narrowest portion of the electrode the threshold voltage can be reduced. Alternative embodiments are illustrated in FIGS. 9A and 9B wherein a secondary termination, 14" can be employed thereby providing overvoltage protection with grounding through the secondary termination. At least one electrode can be converging as illustrated in FIG. 9B.

An embodiment of the invention is illustrated in schematic top view in FIG. 10. In FIG. 10 a three-terminal overvoltage protection component is illustrated wherein ground electrodes, 28 and 29, with associated ground terminations, 30, reside in the gap. The gap may be a gas filled gap. The electrodes, 32, which preferably converge, are electrically connected to external terminations, 34. The three-terminal device is particularly suitable for use between two transmission lines wherein the overvoltage can be directed to ground in either transmission line or in both lines.

The overvoltage protection devices dissipate overvoltage to ground thereby allowing capacitors to achieve higher electrostatic discharge capability. In standard MLCC's if the voltage applied to the capacitor during the electrostatic discharge (ESD) event exceeds the breakdown voltage, the component fails. However, by incorporating the overvoltage protection device the voltage applied during the ESD event is dissipated by internal arcing before any damage occurs to the capacitive couple. In the prior art external arcing has been used to protect ESD susceptible MLCC's with varying degrees of success because the surface of the part can be exposed to various environmental conditions, contaminants and/or coatings that affect the external arc and therefore the ability to control the arc voltage is thwarted. Internal arcing provides a consistent way to realize high ESD capable capacitors. More particularly the overvoltage protection component provides a way of protecting sensitive capacitors from overvoltage in a small, low capacitance, MLCC which is the type of capacitor most susceptible to failures caused by ESD.

Furthermore the overvoltage protection components (OVP) described in this invention can also provide a spark gap for a detonation circuit, that are also described as fuzes. In these cases the overvoltage protection device would be placed between the power source and electronic fuze initiator (EFI) as shown in FIG. 10A. The overvoltage protection device (OVP) replaces other spark gap devices such as gas discharge tubes that typically take up more volume thus allowing the circuit to be miniaturized. Also per the teachings of this invention by combining three or more terminals with an appropriate capacitance an overvoltage protection device can be designed that combines the functionality of the charging capacitor and a spark gap so allowing for further miniaturization.

The electrodes are not particularly limited herein with any conductor suitable for demonstration of the teachings. Electrodes suitable for use in capacitors are particularly suitable due to their widespread availability and the ability to manufacture overvoltage protection components in a manufacturing facility designed for the manufacture of capacitors, and particularly multi-layered ceramic capacitors. Base metal electrodes are particularly suitable for demonstration of the invention as are precious metal electrodes.

The ceramic material used as a dielectric or as a material in and/or surrounding the gap is not particularly limited herein. Materials suitable for use in COG and X7R capacitors are particularly suitable for use in the demonstration of the present invention due to their wide spread use in the manufacture of MLCC's and the ability to manufacture overvoltage protection components in facilities designed for the manufacture of MLCC's. In the case of base metal electrodes, such as nickel or copper, reducing atmospheres are used during the co-sintering of the multi-layers and an oxygen annealing stage is typically used to re-oxidize the ceramic oxides thereby replacing any oxygen vacancies formed during the sintering process. By careful selection of the dielectric material and annealing atmosphere the composition of gas within the gap can be controlled.

It will be recognized to those skilled in the art of MLCC manufacturing that combinations of the aforementioned materials and processes allow for a broad range of different overvoltage protection components to be realized. The application of this technology is described in the following non-limiting examples that describe how an overvoltage protection components can be formed using similar processes to MLCC.

Figure 36:
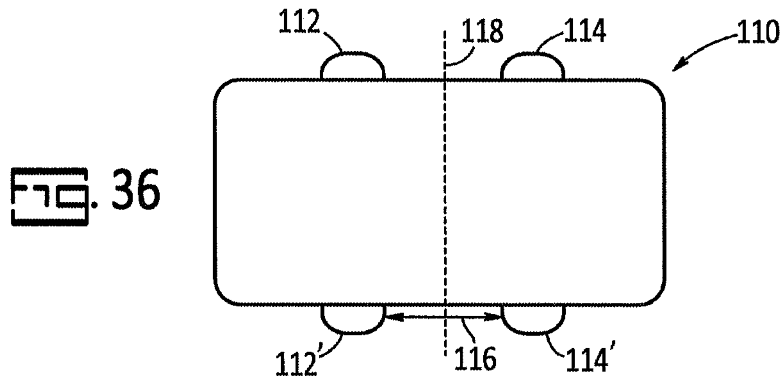
FIG. 36 is a top schematic view of an embodiment of the invention.
Figure 37A:
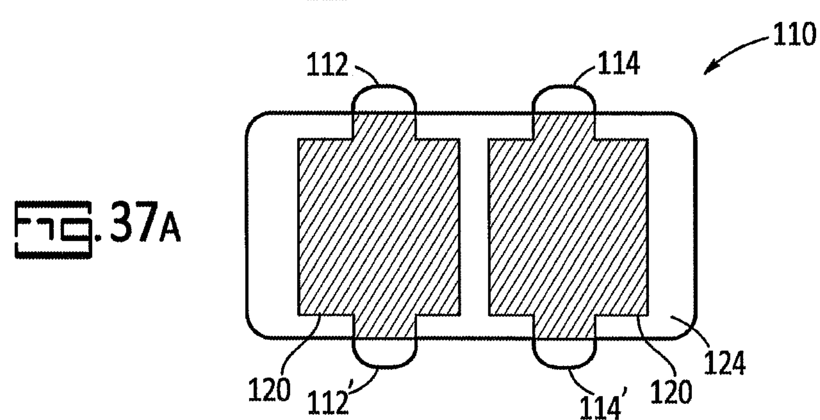
FIGS. 37A, 37B and 38 are plan views of internal electrodes of an embodiment of the invention.
Figure 37B:
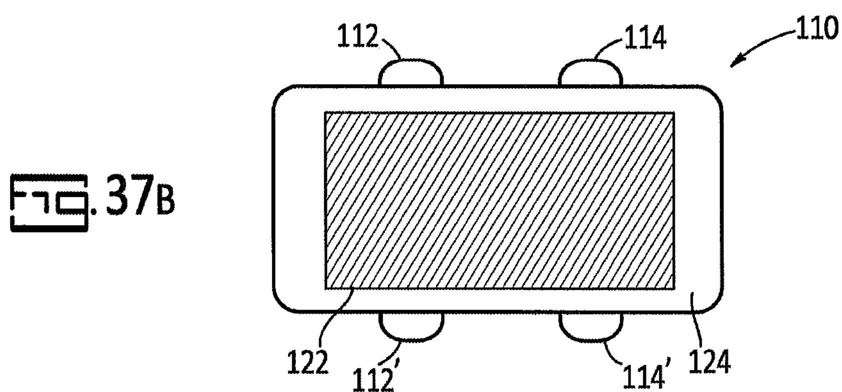
Figure 38:
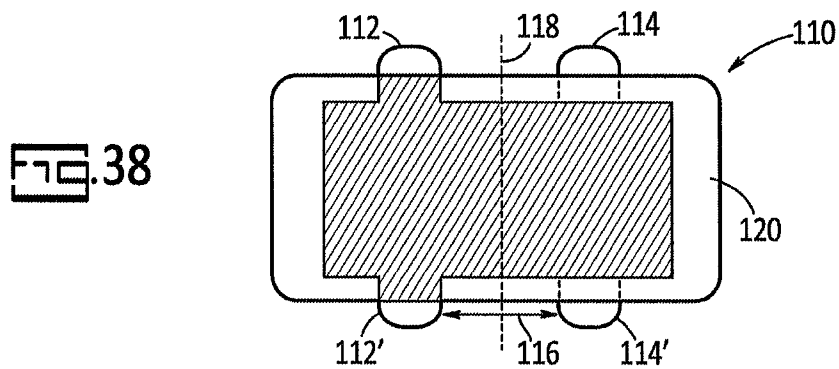

An embodiment of the invention is illustrated in schematic top view in FIG. 36 and will be described with reference to FIGS. 36, 37A, 37B and 38. The embodiment of FIG. 36 can employ electrodes as illustrated in cross-sectional schematic top view in FIGS. 37A and 37B wherein the electrode illustrated in FIG. 37B is a floating electrode between adjacent coplanar electrodes of opposite polarity as illustrated in cross-sectional schematic top view in FIG. 37A. Alternatively, the embodiment of FIG. 36 can employ electrodes as illustrated in FIG. 38 wherein the electrodes are stacked with alternate polarity as would be realized to one of skill in the art. In FIG. 36, a filter, 110, comprises ground terminals, 112, 112' and signal terminals, 114, 114' wherein at least one each is preferably disposed on a common side of the filter. The ground terminals and power terminals are separated on a common face by a distance, 116, and are preferably in a centrosymmetric arrangement relative to a center line, 118. With reference to FIGS. 37A and 37B, the inner electrodes, 120, connected to the signal terminals, 114 and 114', are separated from the inner electrode of the ground terminals, 112 and 112', by dielectric. With reference to FIG. 38 adjacent plates are separated by dielectric as would be realized to one of skill in the art. Repeating the electrode prints allows a multilayered ceramic capacitor to be formed between the ground and power terminals as well known in the art. The centrosymmetric arrangement is not necessary for demonstration of the teachings but is highly preferable in practice since this eliminates incorrect orientation due to the ground and signal terminals being interchangeable in some embodiments. Terminals disposed diagonally would be suitable for demonstration of the invention, however, diagonal terminals are not suitable for use with slotted circuit boards. The filter comprises alternating conductive layers with the ground and power portions each representing a capacitive couple as will be realized. At least one layer may comprise a gap as set forth elsewhere herein.

In one embodiment a single capacitor is formed, as would be achieved using plates as in FIG. 38, and the resulting capacitor would have a voltage capability limited to the breakdown of the dielectric material between the adjacent electrodes. Floating electrodes, as would be achieved using plates of FIGS. 37A and 37B, allow at least two capacitors to be formed with a shared floating electrode. This inner electrode design divides the applied voltage between the two capacitors allowing a higher voltage rating to be realized although capacitance is lowered since;

$$1/Cap._{total}=1/Cap_1+1/Cap_2$$

The number of inner electrodes can be extended to realize more that two capacitors in series thereby achieving an even higher voltage capability for a given dielectric separation thickness. While illustrated with four external terminations, two ground and two power, any even number of external terminations can be employed. In some embodiments it is preferable to have only two terminals, one ground and one power, on a common side to allow for face down mounting of the filter.

Figure 39:
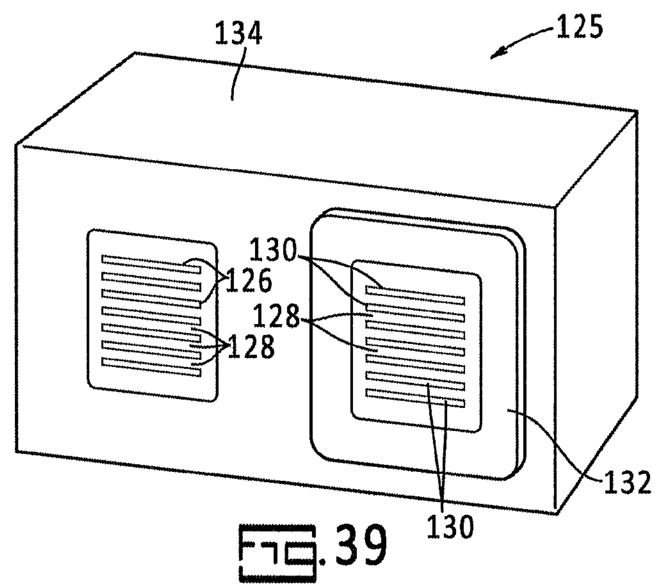
FIG. 39 is a bottom perspective schematic view of an embodiment of the invention.

An embodiment of the invention is illustrated in bottom perspective schematic view in FIG. 39. In FIG. 39 the filter, 125, comprises internal ground electrodes, 126, with dielectric, 128, between the electrodes. As would be realized the internal ground electrodes may be terminated for mounting to a circuit trace. Internal power electrodes, 130, with dielectric, 128, between the electrodes, are surrounded by an insulator, 132. The filter is preferably encased within a conductor, 134, which provides radiation filtration properties. In one embodiment the ground terminations and conductive encasement can be commonly grounded to filter out both transmitted and radiated electromagnetic interference within the same component. The conductive encasement functions as a Faraday cage thereby excluding radiated electromagnetic interference. The embodiment illustrated in FIG. 39 can be a surface mount with the internal conducting layers parallel to the surface or in a face down mount with the internal conducting layers perpendicular to the surface. In a face down mount it is preferable to only have external terminations on the downward face. The embodiment illustrated in FIG. 39 is also suitable for use as an embedded capacitor which provides some advantages since the ground planes of the resulting embedded circuit can be arranged to obtain shielding to provide protection from radiated electromagnetic interference which is a potential source of additional noise.

Figure 40:
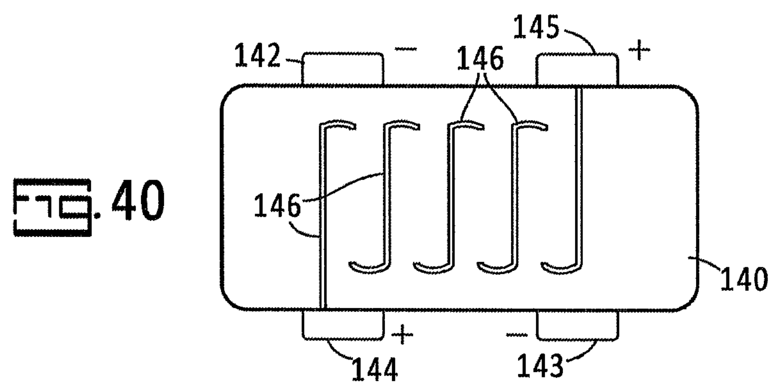
FIG. 40 is a top perspective schematic view of an embodiment of the invention.
Figure 41:
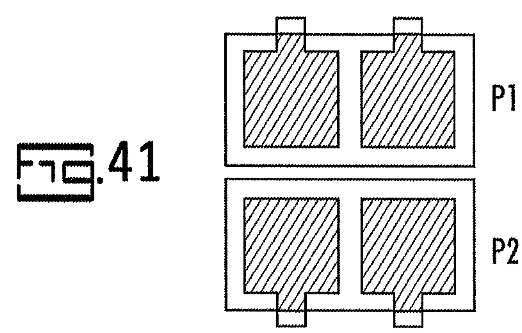
FIG. 41 is a plan view of an internal electrode of an embodiment of the invention.
Figure 42:
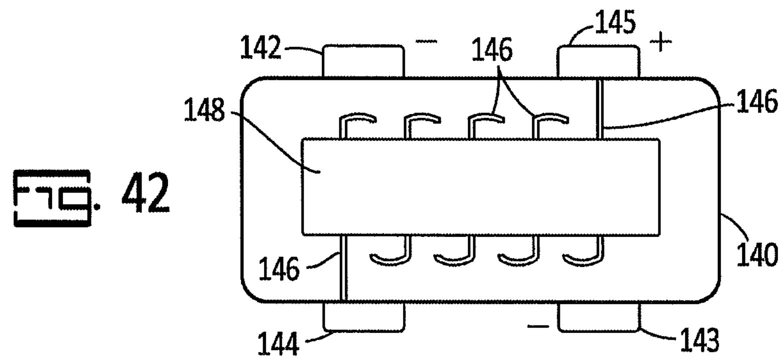
FIG. 42 is a top perspective schematic view of an embodiment of the invention.

An embodiment of the invention is illustrated in top schematic view in FIG. 40. In FIG. 40, an assembly comprising two multilayer ceramic capacitors, 140, is prepared by interleaving conductive plates P1 with conductive plates P2 as illustrated in FIG. 41, with dielectric there between for the purposes of further discussion. The layered construction is formed and terminations formed wherein terminals 142 and 143 are designated ground and terminals 144 and 145 are designated power. The terminals are preferably fired thick film copper, silver, palladium/silver or a conductive epoxy. An inductor is formed between the power terminals by printing at least the initial portions of a conductive trace, 146. The conductive trace may be printed on the surface of the assembly or as an interior layer with conductive layers and/or overvoltage protection providing layers comprising gaps on at least one side thereof. The conductive trace can be formed by printing of a conductive epoxy and curing the epoxy or by using high intensity light to sinter copper or silver conductors. In its simplest form a conductive trace between terminals 144 and 145 would serve as a low value inductor. However, in many filter applications a larger inductance is required than can be realized by using conductive traces alone. This is solved in this embodiment of the invention by forming a higher value inductor using a ferrite. Continuing to FIG. 42, a ferromagnetic or ferrimagnetic material, 148, is formed over the printed portion of the conductive trace. The ferromagnetic or ferrimagnetic material can be formed by dispersing or printing a polymer, such as an epoxy, containing the ferromagnetic or ferrimagnetic material into the desired pattern and heat curing the polymer.

Figure 43:
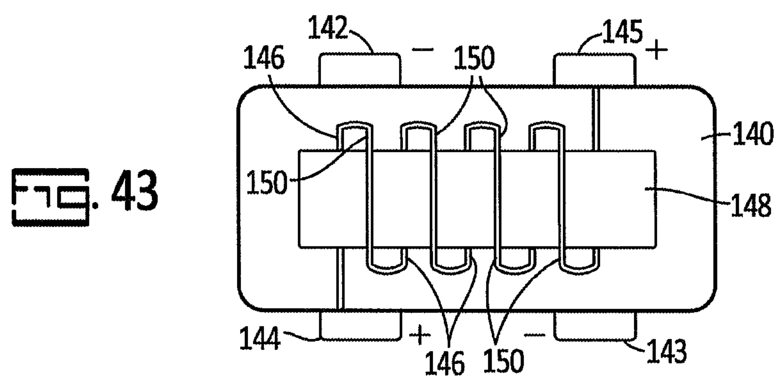
FIG. 43 is a top perspective schematic view of an embodiment of the invention.
Figure 44:
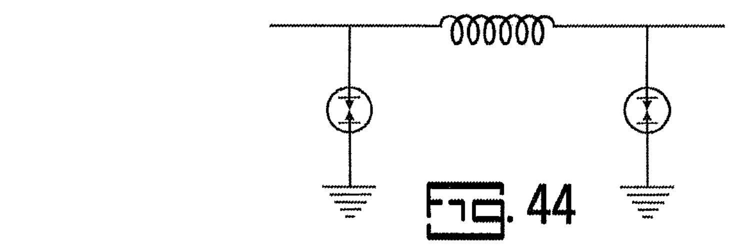
FIG. 44 is an electrical schematic representation of an embodiment of the invention.

With reference to FIG. 43, any remaining portion of the conductive trace is formed over the ferromagnetic or ferrimagnetic material thereby forming, with the initial portions, a winding, 150, around the ferromagnetic or ferrimagnetic material. In one embodiment the entire conductive trace is formed and the ferromagnetic or ferrimagnetic material is not wrapped but the ferromagnetic or ferrimagnetic material is still magnetically coupled to the conductive trace. An electrical schematic diagram of the filter of FIG. 43 is illustrated in FIG. 44. As would be apparent the inductor can be on or near the surface of the device such that capacitance and/or overvoltage protection is on one side of the inductor or the inductor may be formed as an interior layer with capacitance and/or overvoltage protection on either side of the inductor.

Figure 45:
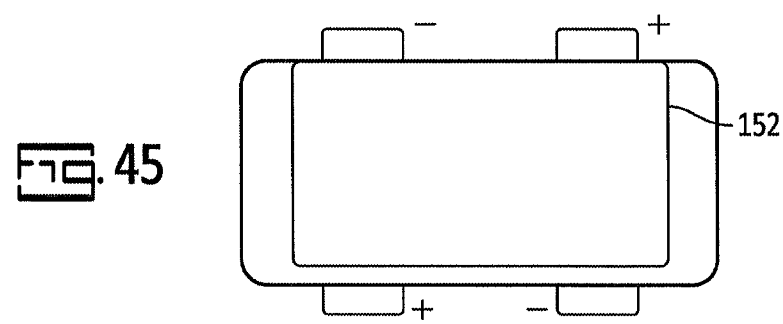
FIG. 45 is a plan view of an internal electrode of an embodiment of the invention.

An embodiment is illustrated in FIG. 45 wherein a non-conductive coating, 152, is applied which protects the inductive components but which allows the terminals to be plated without plating of the conductive traces. The non-conductive coating provides protection from the environment. The non-conductive coating is most preferably applied by printing and curing a polymer coating but other methods could be employed. The polymer coating is not particularly limited.

Figure 46:
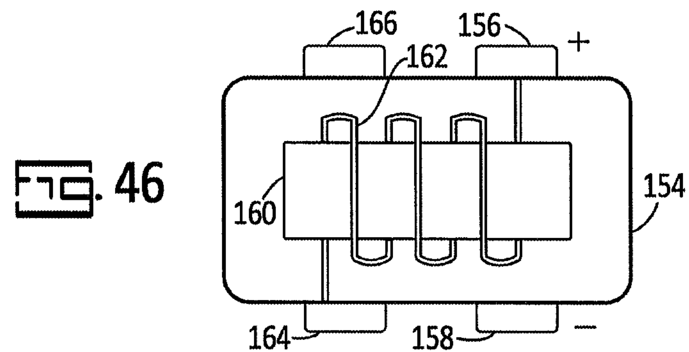
FIG. 46 is a top perspective schematic view of an embodiment of the invention.
Figure 46A:
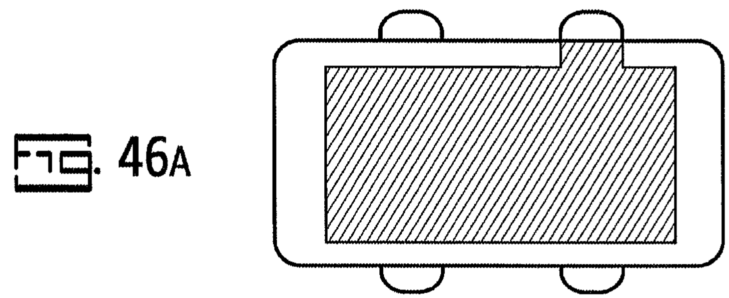
FIGS. 46A and 46B are plan views of internal electrodes of an embodiment of the invention.
Figure 46B:
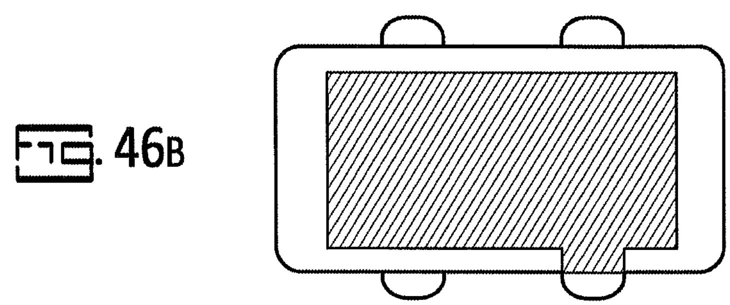
Figure 47:
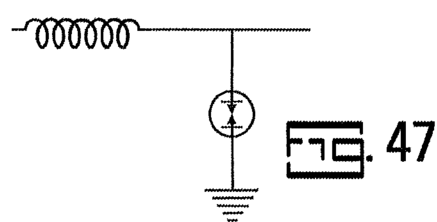
FIG. 47 is an electrical schematic representation of an embodiment of the invention.

The combination of a multi-layered ceramic capacitor with an integral inductor formed either on the surface thereof or embedded therein can be extended to form different types of filters based on the configuration. The further inclusion of a layer comprising a gap, for overvoltage protection, provides for multi-functionality in a common component. An embodiment of the invention is illustrated in FIG. 46. In FIG. 46, a multilayered ceramic capacitor, 154, with a power termination, 156, and a ground termination, 158, has formed thereon either as an embedded layer or on an external surface a ferromagnetic or ferrimagnetic material, 160, with a conductive trace, 162, wrapped around the ferromagnetic or ferrimagnetic material. It would be realized that the conductive trace may be on the surface and not wrap the ferromagnetic or ferrimagnetic material even though wrapping is preferred. The conductive trace is in electrical contact between the power termination, 156, and a secondary termination, 164, wherein the secondary termination is only in electrical contact with the capacitor through the conductive trace. An optional but preferred tertiary termination, 166, is not in electrical contact with the capacitor or the conductive trace and is provided for mounting purposes or for connectivity with at least one overvoltage protection layer. In this case the internal electrode prints of the multilayer capacitor are represented by FIGS. 46A and 46B respectively. An electrical schematic diagram of the filter illustrated in FIG. 46 is provided in FIG. 47.

Figure 48:
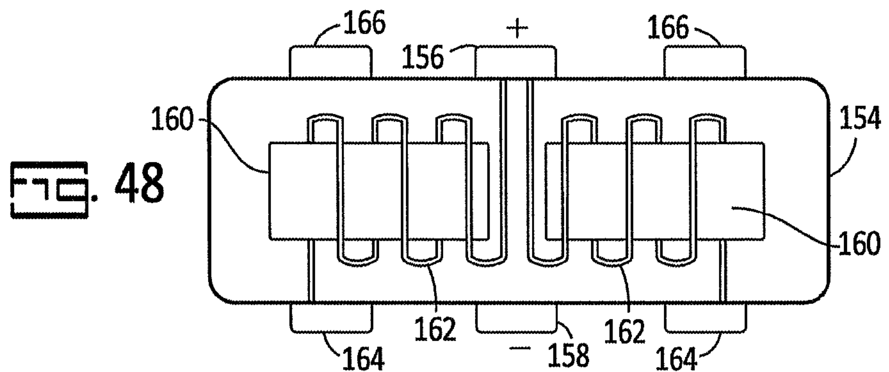
FIG. 48 is a top perspective schematic view of an embodiment of the invention.
Figure 48A:
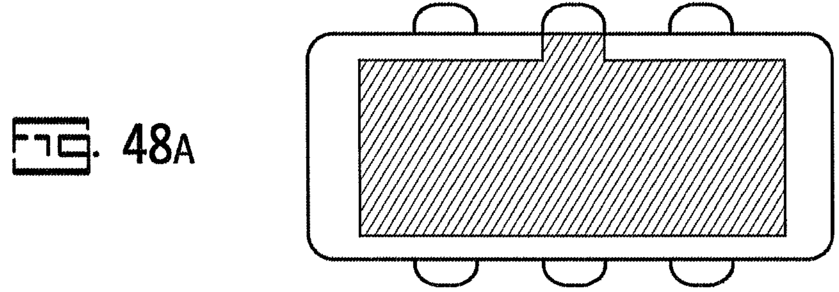
FIGS. 48A and 48B are plan views of internal electrodes of an embodiment of the invention.
Figure 48B:
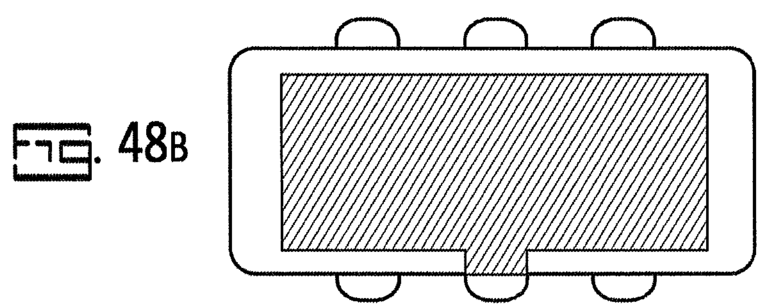
Figure 49:
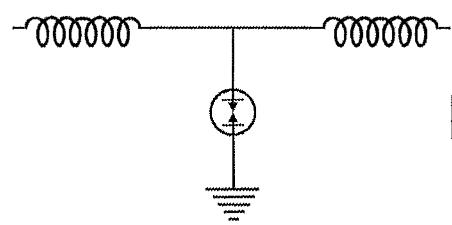
FIG. 49 is an electrical schematic representation of an embodiment of the invention.

An embodiment of the invention is illustrated in a schematic view in FIG. 48. In FIG. 48, a multilayered ceramic capacitor, 154, with a power termination, 156, and a ground termination, 158, has formed thereon two ferromagnetic or ferrimagnetic materials, 160, with separate conductive traces, 162, magnetically coupled to the ferromagnetic or ferrimagnetic material. It would be realized that one or both of the conductive traces may be on the surface or wrapped around the ferromagnetic or ferrimagnetic material with wrapping being preferred. Each conductive trace is in electrical contact between the power termination, 156, and separate secondary terminations, 164, wherein each secondary termination is only in electrical contact with the capacitor through the conductive trace. Optional but preferred tertiary terminations, 166, are not in electrical contact with the capacitor or the conductive trace and are provided to facilitate surface mounting or for overvoltage protection termination. In this case the internal electrode prints of the multilayer capacitor are represented by FIGS. 48A and 48B respectively. An electrical schematic diagram of the filter illustrated in FIG. 48 is provided in FIG. 49.

The filter of the instant invention provides flexibility with regards to capacitance, inductance and overvoltage protection. With regards to inductance, resonance frequencies can be adjusted over a broad range by adjusting the capacitance by the number of layers in the capacitor and by the overlap areas as well known in the field of multi-layered ceramic capacitor manufacturing. Inductance can be varied by the selection of the type of magnetic material used and the number of windings as well understood in the field of inductor manufacturing. While offering a significant advantage, there is a further desire to have filters which are tunable after the filter is assembled in the circuit. This allows the response to be finely adjusted to a desired level and allows for a reduction in filter to filter variability in an assembled circuit.

A tunable filter will be described with reference to FIG. 50 wherein a tunable filter is illustrated in top schematic view. In FIG. 50, a two capacitor base unit, 170, is provided with one capacitor being between terminations B and E and the other capacitor between terminations C and F. For the purposes of discussion terminations B and C are ground terminations and terminations E and F are power terminations. A conductive trace, 172, is formed between a secondary termination, A, and termination F by printing in the desired pattern or by printing a larger area and laser ablating excess material to achieve the desired conductive area and pattern. A conductive connector, 174, is formed between the power terminations E and F. A ferromagnetic or ferrimagnetic material, not shown, is then formed over the conductive trace. As would be realized the inductor may be wrapped with the conductive trace. A schematic electrical diagram of the resulting filter is illustrated in FIG. 51. The filter can be tuned by altering the conductive connector, 174, to remove contact thereby lowering the overall capacitance. Alternatively, the inductor can be ablated to increase inductance.

Figure 55:
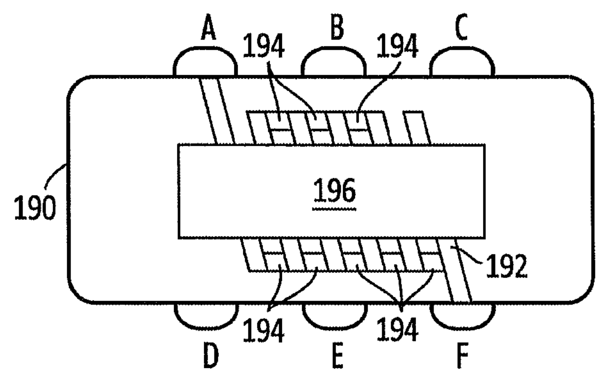
Figure 56:
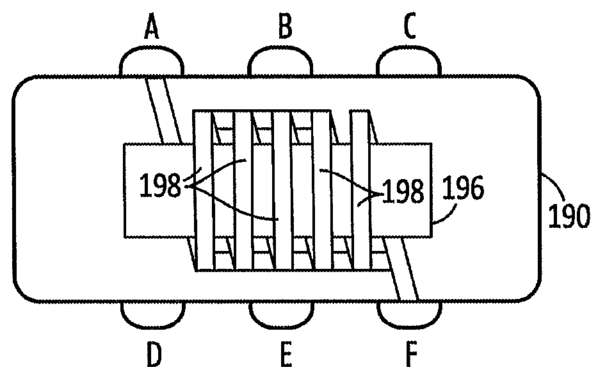
Figure 57:
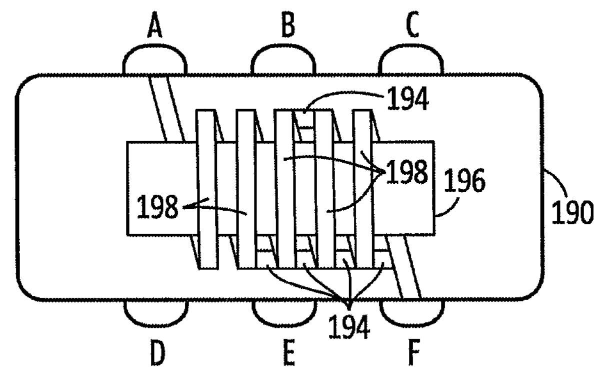

An embodiment of the invention will be described with reference to FIG. 54-57. A capacitor, 190, has printed thereon a first conductive trace, 92, between terminals A and F. As printed the first conductive print comprises connectors, 194, which will be described in more detail herein. A ferromagnetic or ferrimagnetic material, 196, is printed on top of the first conductive trace as shown in FIG. 55. Second conductive traces, 198, are then printed to form conductive paths around the ferromagnetic or ferrimagnetic material as illustrate in FIG. 56. For the purposes of illustration, the embodiment of FIG. 56 would have minimal inductance since the conductive path around the ferromagnetic or ferrimagnetic material is minimal. By selectively ablating away the connections, 194, between traces above and below the ferromagnetic or ferrimagnetic material, 196, the number of turns around the ferrite can be increased for higher inductance as illustrated in FIG. 57. By removing some of the ferrite the inductance can be reduced giving a further means to tune the filter. A representative range of filter insertion loss is illustrated in FIG. 52. In this example the capacitance between B and E and C and F each have a value of 2.8 nF so when both capacitors remain connected the total capacitance is 5.6 nF. Using laser ablation to remove the conductive trace between E and G lowers this to 2.8 nF shifting the insertion loss to higher frequency. Inductances in the range 5 to 10 H are shown using a laser to increase the number of windings around the ferrite inductor shifts the insertion loss to lower frequency. The frequency response of parameters other than insertion loss can also be adjusted in this way. Some examples of other parameters are output power, noise, AC voltage and impedance.

In any embodiments with multiple capacitive couples the capacitance of each separate capacitance couple can be independently selected. In a tunable capacitor, for example, it may be beneficial to have one capacitive couple which is lower than the other with the lower capacitance capacitor being completely removed from the circuit, by contact ablation, thereby defining the extent of adjustable range of the parallel capacitors.

Figure 53:
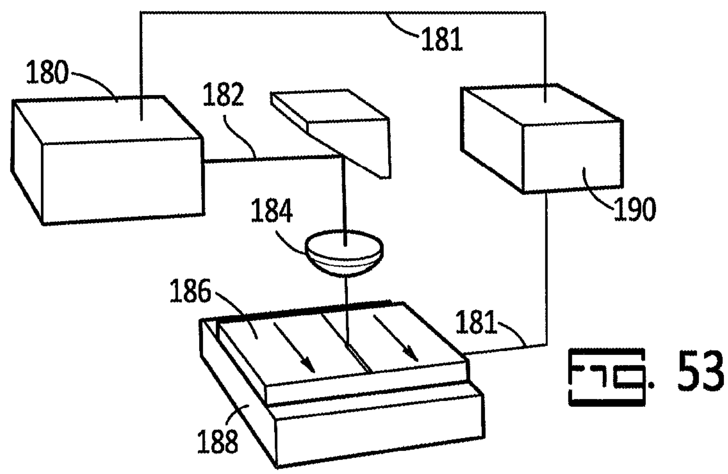
FIG. 53 is a schematic representation of an embodiment of the invention.
Figure 54:
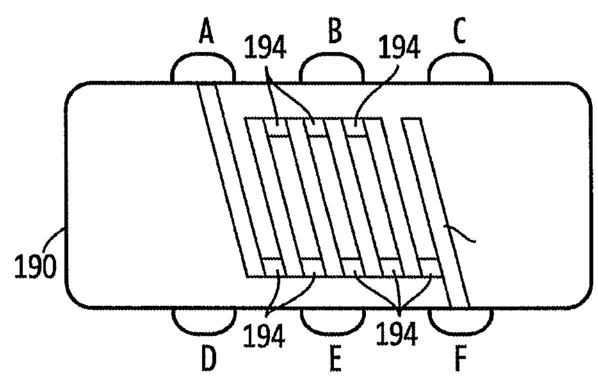
FIGS. 54-57 illustrate an embodiment of the invention.

An embodiment of the invention is illustrated in FIG. 53 wherein a laser source, 180, forms a laser, 182, which is focused by focusing optics, 184, to ablate selective material on a surface of the filter, 186. The position of the filter is translated by a movable platen, 188, such that the specific location desiring to be ablated is impinged by the laser. The electrical characteristics of the filter can be monitored via a measurement circuit with output to an impedance analyzer, 190, that also controls the output of the laser, position of the optics and platen containing the assembled filter through communication links, 181. In this way the ablation can be controlled in a feedback loop whereby the combination of laser energy applied and position is used to ablate a sufficient amount of material at the specified location until a desired result is obtained.

A particular advantage provided by the instant application is the ability to form filters comprising capacitive, inductive and over voltage protection components without the problems typically associated with sintering. Since the sintering can occur on an isolated multilayered ceramic capacitor component followed by formation of the inductive component the materials of construction for the capacitor internal conductors, for capacitance or overvoltage protection, and dielectric is not particularly limited. Base metal capacitors, utilizing base metals such as copper and nickel, are preferred due to cost considerations but the invention can be demonstrated with base metal or precious metal electrodes such as silver, palladium, gold and platinum as well known in the art. Ceramic dielectrics such as barium titanate or calcium zirconate based materials are suitable for demonstration of the invention.

The ferromagnetic and ferrimagnetic materials are not particularly limited herein. Particularly suitable materials for demonstrating the invention are iron oxides $Fe_20_3$ and $Fe_30_4$, including $\gamma$-$Fe_20_3$; spinels with the formulae M $Fe_20_4$, where M is a divalent transition metal ion such as Mn, Ni, Co, Zn, Cu, Mg, mixtures of these, or even $Fe^{3+}$ compensated with $Li^+$; magneto plumbite oxides with the generic formula $M'Fe_{12}O_{19}$ where M' can be a divalent ion such as Ba, Sr or Pb; Magnetic garnets with a generic formula of $M'Fe_50_{12}$ where M" can be Y, another rare earth element, Al, Ca, V or Bi or mixtures of these. These materials may also contain additions of other materials such as Si to further modify there magnetic properties. Spinets containing Ni and Mn are particularly suitable for filters for use at radio frequencies.

The external terminations are not particularly limited herein with terminations typically used in the manufacture of multilayered ceramic capacitors being suitable for demonstration of the invention. Other electronic components may be incorporated into the circuit to augment the filter such as resistors parallel the capacitors to allow safe discharge of the device to ground. Other components such as fuses and the like may be included as an integral component, a parallel component or a serial component may be included.

Examples 1/1A

A base metal electrode (BME) multi layer ceramic capacitor (MLCC) with a X7R temperature coefficient in 1812 case size was constructed so that an air gap existed between two internal electrodes of opposite polarity to incorporate an overvoltage protection component in an MLCC. The ceramic dielectric material was a $BaTiO_3$ based formulation compatible with the Ni internal electrodes. The length of the unfired, or green, capacitor was approximately 5.33 mm (0.21 inches) and the width was approximately 3.81 mm (0.15 inches).

The unfired, or green, capacitors were assembled using a dry layer build up process typical in the MLCC industry that incorporates internal electrodes screen printed onto ceramic dielectric tape. The electrodes were screen printed in a pattern containing an array of 1200 capacitors that were singulated into individual green capacitors after the build up process. A small drop of resin was dispensed by pneumatic syringe onto several green ceramic tape layers in the area between the opposing electrodes such that it spanned the gap and contacted each electrode. These samples of the overvoltage protection component were labeled Example 1A and compared to the other MLCC manufactured at this time, the control group Example 1. The gap between the opposing electrodes was 0.30 mm (0.012 inches) and the diameter of the resin drop was typically 0.38 mm (0.015 inches). The internal electrode was made such that the width of the electrode was approximately 3.20 mm (0.126 inches) and length was 5.03 mm (0.198 inches). The ends of the electrode were tapered, with the taper starting at approximately 8.13 mm (0.032 inches) from the end of the electrode and tapered down to a width of approximately 2.44 mm (0.096 inches). FIG. 11 contains an illustration of the electrode and the resin drop. The resin was applied to approximately 30% of the printed electrode array. The green capacitors surrounding the area with the resin drops served as a control group. The sacrificial resin was removed during the binder burnout processing described below, leaving an air gap. The resin was a solution of mainly ethyl cellulose and plasticizers dissolved into dihydro terpineol, with a solids content of approximately 5%. The total green tape thickness for each active layer was 40 microns and for each blank ceramic layer was 25 microns. The capacitors contained 28 total internal electrode layers. After stacking 9 blank ceramic layers and 14 electrode layers the stacking process was paused and two blank ceramic layers were inserted into the stack followed by one printed layer containing the resin drop which was positioned such that the gap between the electrodes was in the approximate center of the capacitor. Next three blank ceramic layers were inserted into the capacitor stack followed by the remaining 13 electrode layers and 9 blank ceramic layers. The entire stack was subjected to a lamination pressure cycle sufficient to bond all layers together.

The organic binders were removed from the green capacitors by heating in a controlled atmosphere to 230-280° C. over a period of 40-96 hours. The atmosphere consisted of nitrogen, oxygen, and water vapor with an $O_2$ concentration of 5-21% and a dewpoint of 30-60° C. After binder burnout, the capacitors were fired at 1280-1320° C. for two hours in a reducing atmosphere of nitrogen, hydrogen, and water vapor with a $pO_2$ of $10^{-8}$ to $10^{-10}$ atmospheres of oxygen and a dewpoint of 25-40° C. Ramp rate up to the peak temperature ranged from 1-5° C. per minute. During cooling from the peak temperature, the capacitors were subjected to a reoxidation process at 750-1050° C. for two to eight hours. The atmosphere during reoxidation consisted of nitrogen, oxygen, and water vapor with a $pO_2$ of 5-100 PPM $O_2$ and dewpoint of 30-40° C. The reoxidation process restores oxygen to the dielectric crystal structure to eliminate oxygen vacancies which may have occurred during firing.

After thermal processing the sintered capacitors were subjected to abrasive tumbling to smooth any sharp edges and corners and to fully expose the internal electrodes. After abrasive tumbling a fritted copper termination paste was applied to the ends of the capacitors to establish an electrical connection to the exposed internal electrodes. After the copper paste was dry, the capacitors were passed through a termination sintering furnace utilizing a nitrogen atmosphere with low partial pressure of oxygen and controlled temperature profile to oxidize the binders and sinter the termination. The temperature in the furnace was increased from room temperature to 870° C. at a ramp rate of approximately 20° C./min, followed by a gradual cool down to room temperature.

After termination an electroplated Ni barrier layer ranging in thickness from 1.27 μm (50μ in) to 3.81 μm (150μ in) was applied over the copper termination, followed by an electroplated layer of Sn in thickness ranging from 2.54 μm (100μ in) to 7.52 μm (300μ in).

Figure 12A:
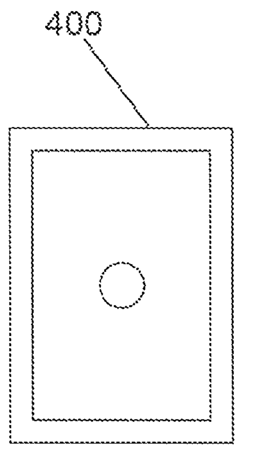
FIG. 12A is a schematic partial cross-sectional view of an embodiment of the invention.
Figure 12B:
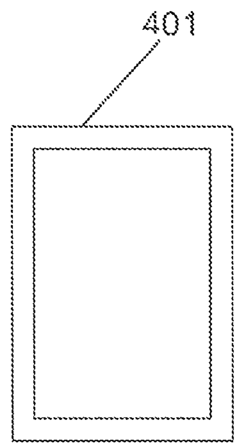
FIG. 12B is a schematic partial cross-sectional view of a standard multi-layer capacitor used as a control.
Figure 13:
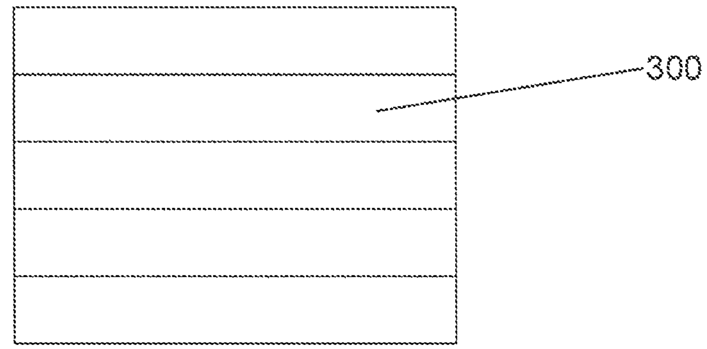
FIG. 13 is cross-sectional view of an embodiment of the invention.

After thermal processing, the capacitors were examined using a non-destructive C-mode scanning acoustical microscope (CSAM) to indicate the size and location of the internal air gaps. The examination confirmed that the resin was removed during thermal processing and an internal air gap was present in the overvoltage protection component samples (Example 1A). In addition, destructive physical analysis (DPA) was performed to characterize the internal gap. CSAM images of an MLCC with the gap and a control are shown in FIGS. 12A and 12B respectively. A photo of the air gap found during DPA is shown in FIG. 13. CSAM was used to sort the MLCC's with the air gap so as to choose parts for testing with consistent size air gaps.

The selected capacitors with the internal air gap (Example 1A) representing an overvoltage protection component and the control capacitor parts (Example 1) were subjected to a voltage ramp of 300 volts/second up to ultimate voltage breakdown (UVBD) followed by a second voltage ramp to breakdown at the same voltage ramp rate. Voltage breakdown is characterized by a sudden increase in measured current, usually due to breakdown of the dielectric layer but this can also be due to arcing across the surface of the capacitor between the terminals. A second UVBD test was performed to confirm whether the high current measurement during the first UVBD test was due to dielectric breakdown or due to surface arcing.

Figure 14:
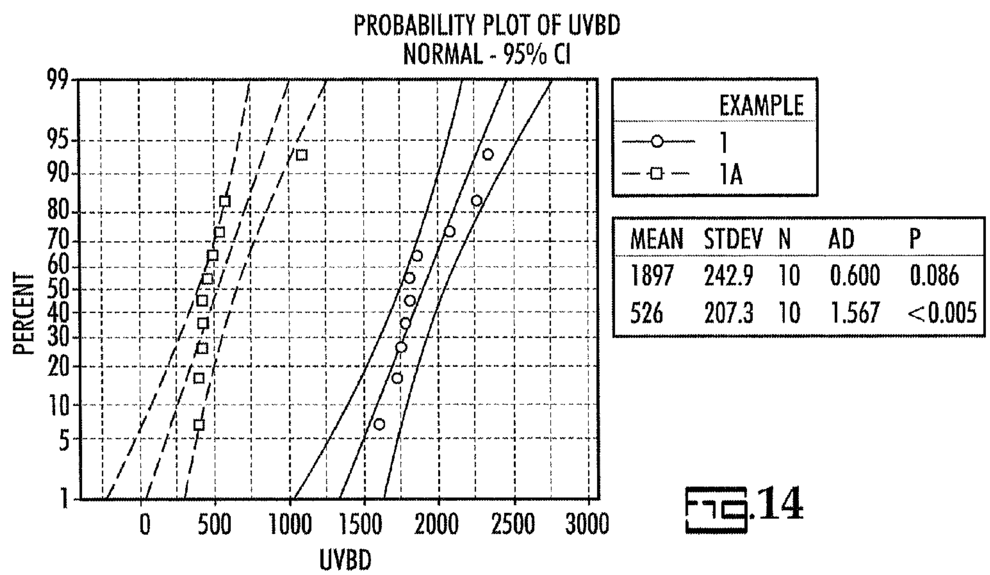
FIG. 14 is a plot illustrating an advantage of the present invention.

The expected average UVBD for this capacitor design and material set is 45 to 55 volts/micron. As can be seen in Table 1, the average UVBD for the control group is 1897 volts which is in the expected range. However, the test group has a significantly lower initial UVBD of 526 volts. The initial UVBD distributions are shown in FIG. 14.

Figure 15:
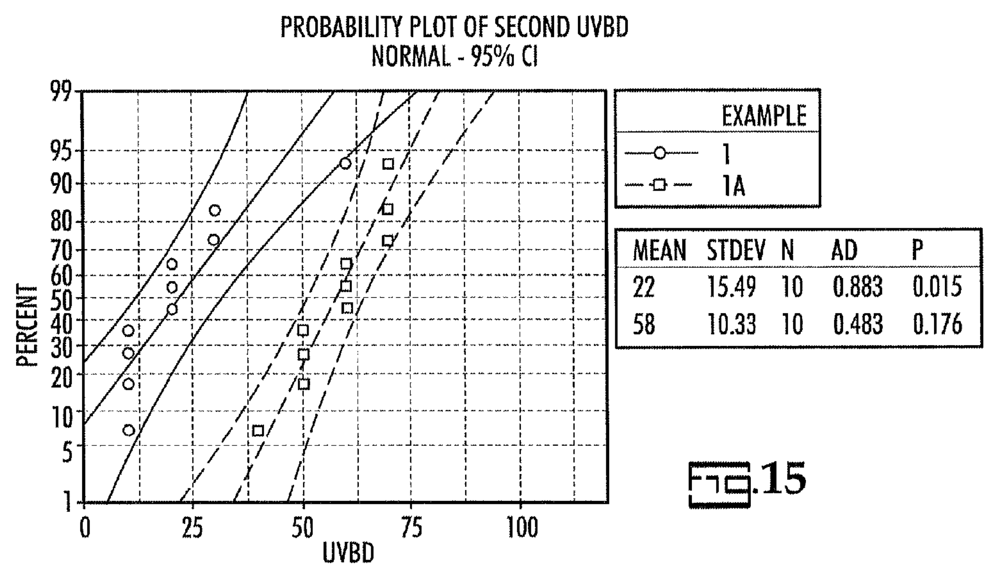
FIG. 15 is a plot illustrating an advantage of the present invention.

The average second UVBD for the control group (1) is 22 volts, indicating that the control group experienced catastrophic dielectric breakdown as a result of the UVBD voltage. The average second UVBD for the test group (1A) is 58 volts. The second UVBD for the test group shows that it retains the ability to take some charge before dissipating the charge through the internal gap. The second UVBD distributions are shown in FIG. 15. DPA examination of the internal construction of the test group after the application of UVBD voltage shows no evidence of dielectric breakdown in the area of the air gap.

Figure 16:
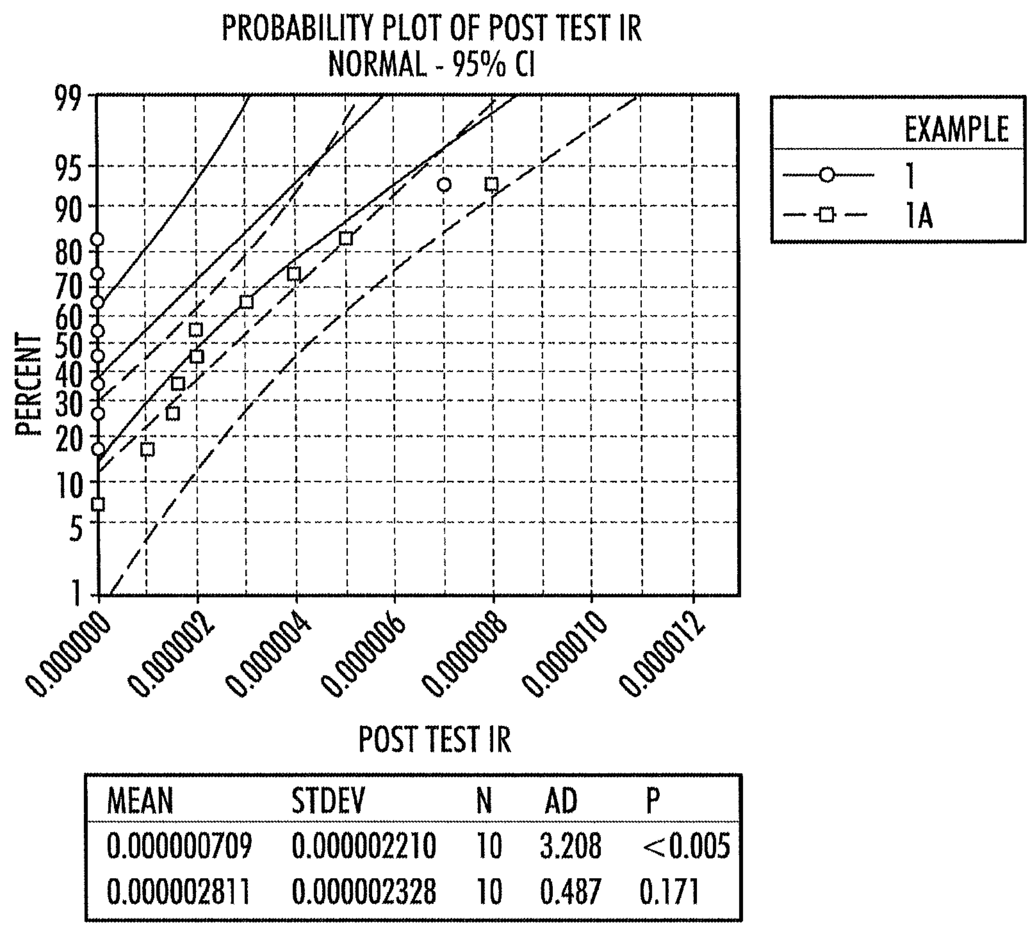
FIG. 16 is a plot illustrating an advantage of the present invention.

The electrical and physical examinations indicate that the MLCC's containing an internal gap dissipated the voltage applied during UVBD testing by arcing internally. However the shift in UVBD for the test group (1A) from 520 volts to ≤100 volts between the first and second UVBD tests indicates a permanent change in the ability of the MLCC's with this design of internal gap to dissipate voltage. An indication of this change is the change in insulation resistance (IR) after the second UVBD test as shown in Table 1. The decrease in IR for the control group (1) shown in FIG. 16 to ≤10 k Ohms after UVBD testing is consistent with a decrease in the IR observed after dielectric breakdown. The post UVBD IR of the test group (1A) is higher on average than the control group.

TABLE 1

Capacitance, DF, UVBD and IR performance for Examples 1-5D (Averages are noted unless stated otherwise.).

| Example | Initial Cap, nF n = 10 | Initial DF, % n = 10 | Initial IR, G Ohms n = 10 | Initial UVBD, volts n = 10 | Second UVBD, volts n = 10 | Post UVBD Cap, nF n = 10 | Post UVBD DF, % n = 10 | Post UVBD IR, G Ohms n = 10 |
|---|---|---|---|---|---|---|---|---|
| 1 | 154 | 1.0 | 11.0 | 1897 | 22 | 155 | 4.7 | <0.01 |
| 1A | 160 | 1.1 | 10.5 | 526 | 58 | 160 | 3.6 | <0.01 |
| 2 | 154 | 1.1 | 14.1 | 1832 | 20 | 155 | 4.8 | <0.01 |
| 2B | 160 | 1.1 | 14.4 | 466 | 97 | 161 | 2.2 | <0.01 |

TABLE 1-continued

Capacitance, DF, UVBD and IR performance for Examples 1-5D (Averages are noted unless stated otherwise.).

| Example | Initial Cap, nF n = 10 | Initial DF, % n = 10 | Initial IR, G Ohms n = 10 | Initial UVBD, volts n = 10 | Second UVBD, volts n = 10 | Post UVBD Cap, nF n = 10 | Post UVBD DF, % n = 10 | Post UVBD IR, G Ohms n = 10 |
|---|---|---|---|---|---|---|---|---|
| 3 | 7.7 | <0.02 | 2800 | 1678 | 271 | Shorted | Shorted | <0.01 |
| 3C | 7.8 | <0.02 | 3000 | 1457 | 986 | 7.8 | <0.02 | Range 0-5490 |
| 4* | 0.23 | <0.02 | 10200 | 2240 | 793 | 0.23 | <0.02 | 4600 |
| 4D | 0.23 | <0.02 | 9350 | 1626 | 1507 | 0.23 | <0.02 | 8400 |
| 5 | 0.82 | 0.006 | 2680 | 2259 | 1086 | 0.82 | <0.02 | 2030 |
| 5E | 0.82 | 0.007 | 3540 | 1427 | 1520 | 0.82 | <0.02 | 3280 |

*only 8 samples were measured in this example.

Examples 2/2B

In Examples 2 & 2B a base metal electrode (BME) multi layer ceramic capacitor (MLCC) with X7R class materials in 1812 case size was constructed in the same manner as described in Examples 1 & 1B so that an air gap existed between two internal electrodes of opposite polarity in the case of Example 2B, except that the capacitors contained three layers with a drop of resin. After stacking 9 blank ceramic layers and 14 electrode layers the stacking process was paused and two blank ceramic layers were inserted into the stack followed by three printed layers containing the resin drop which were positioned such that the gap between the electrodes in each layer was in the approximate center of the capacitor. Next three blank ceramic layers were inserted into the capacitor stack followed by the remaining 13 electrode layers and 9 blank ceramic layers. The entire stack was subjected to a lamination pressure cycle sufficient to bond all layers together.

Figure 17:
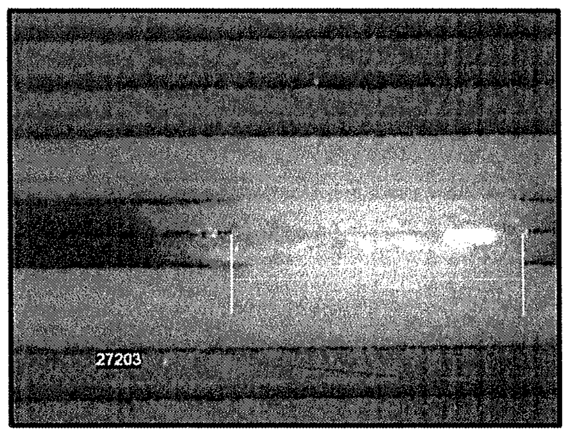
FIG. 17 is cross-sectional view of an embodiment of the invention.
Figure 18:
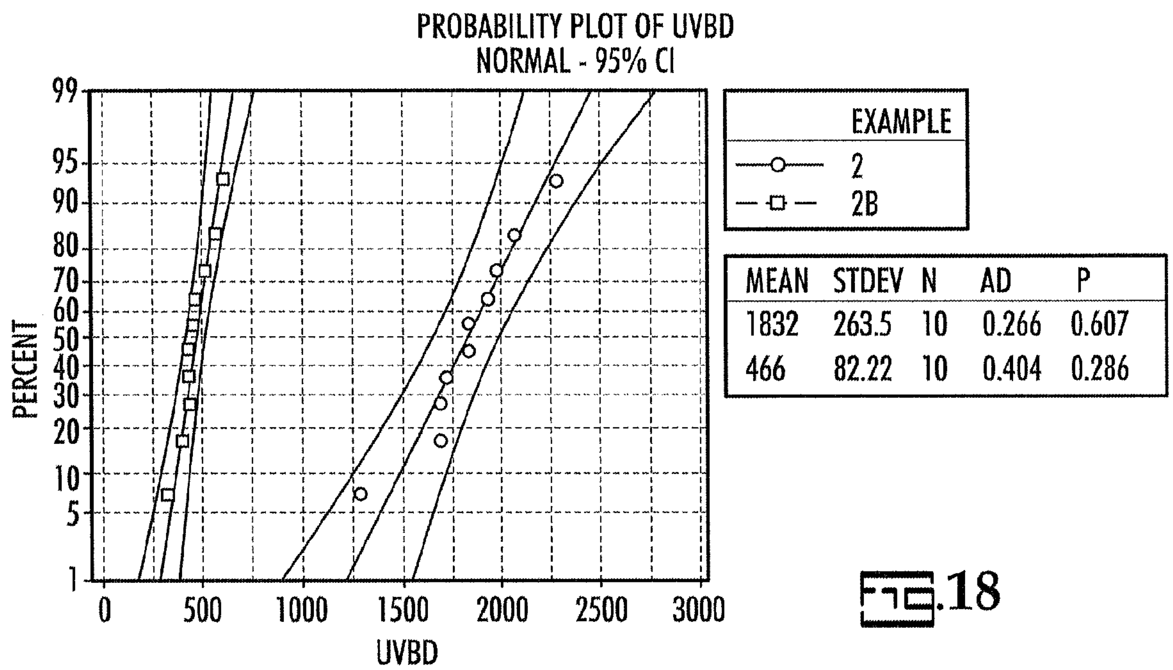
FIG. 18 is a plot illustrating an advantage of the present invention.
Figure 19:
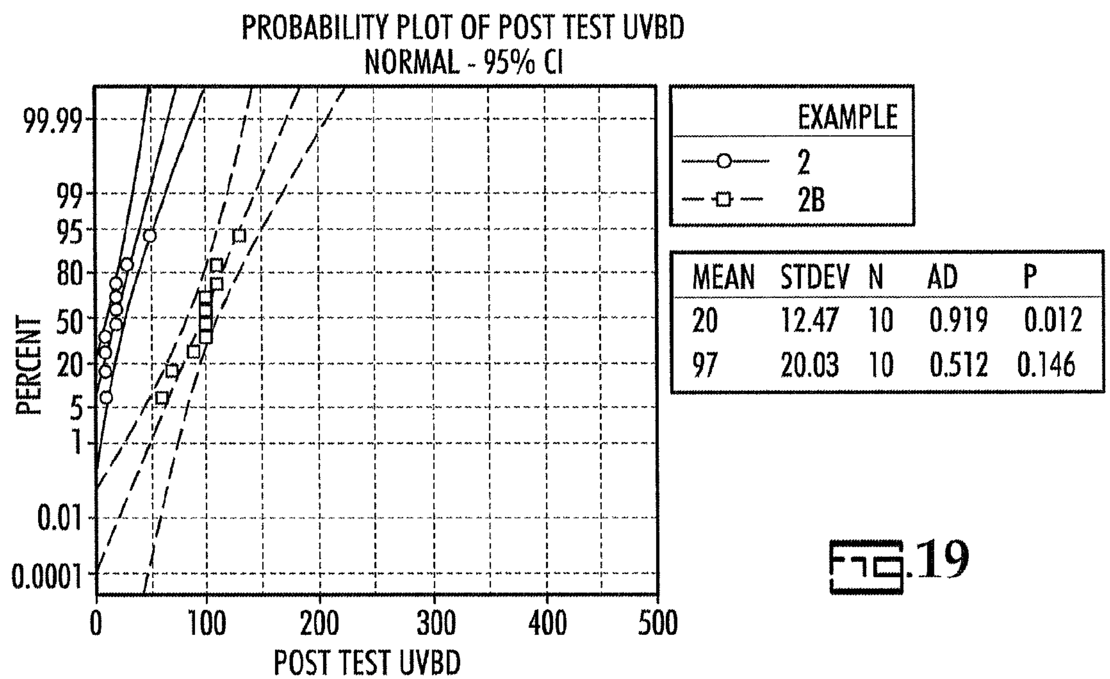
FIG. 19 is a plot illustrating an advantage of the present invention.
Figure 20:
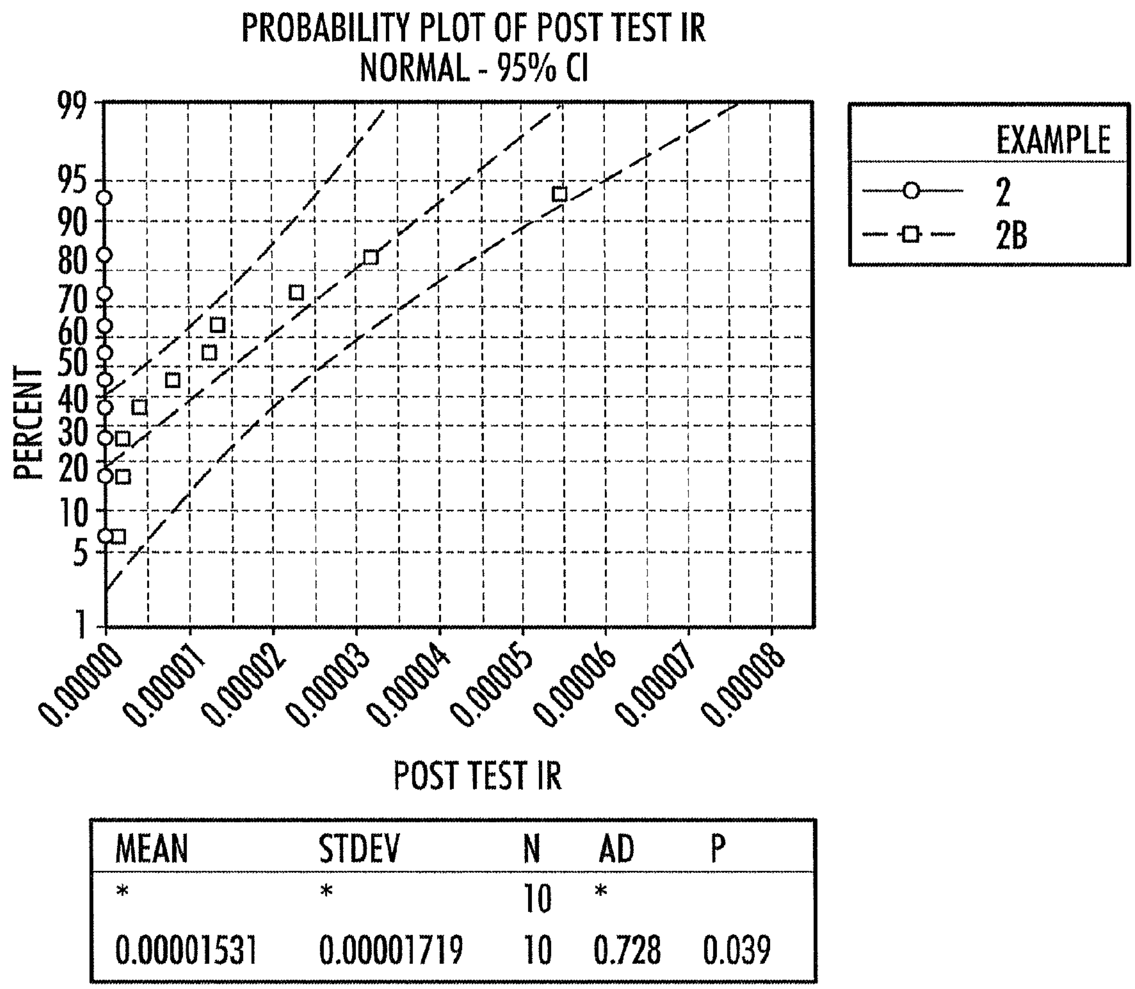
FIG. 20 is a plot illustrating an advantage of the present invention.

The selected capacitors with the internal air gap and the control parts were subjected to a voltage ramp of 300 volts/second up to voltage breakdown, followed by a second voltage ramp to breakdown at the same voltage ramp rate. The initial UVBD of the control group was again in the expected range at 1832 volts (Table 1.). The second UVBD of the control group appears to be similar to the second UVBD of Example 1, but the test group exhibits a small increase in the average second UVBD, from 58 volts in Example 1A to 97 volts in Example 2B. A small increase in insulation resistance can also be seen in Example 2B after the second UVBD test compared to Example 1A. DPA examination of the internal construction of the test group after the application of UVBD voltage shows no evidence of dielectric breakdown in the area of the air gap and a cross-section is shown in FIG. 17. The distributions of Example 2 & 2B for initial UVBD, Second UVBD and IR after second UVBD are shown in FIGS. 18, 19 and 20 respectively.

Examples 3 & 3C

In Example 3 & 3C a base metal electrode (BME) multi layer ceramic capacitor (MLCC) with COG class materials in 1812 case size was constructed in the same manner as Examples 2 & 2B so that an air gap existed between two internal electrodes of opposite polarity in the case of 2B, except that the capacitors were constructed using $CaZrO_3$ based dielectric material compatible with Ni internal electrodes. The total green tape thickness for each active layer was 17 microns and for each blank ceramic layer was 5.8 microns. The capacitors contained 61 total internal electrode layers. After stacking 40 blank ceramic layers and 29 electrode layers, the stacking process was paused and 3 blank ceramic layers were inserted into the stack followed by three printed layers containing the resin drop which was positioned such that the gap between the electrodes of each layer was in the approximate center of the capacitor. Three blank ceramic layers were then inserted into the capacitor stack followed by the remaining 29 electrode layers and 40 blank ceramic layers. The entire stack was subjected to a lamination pressure sufficient to bond all layers together.

Figure 21:
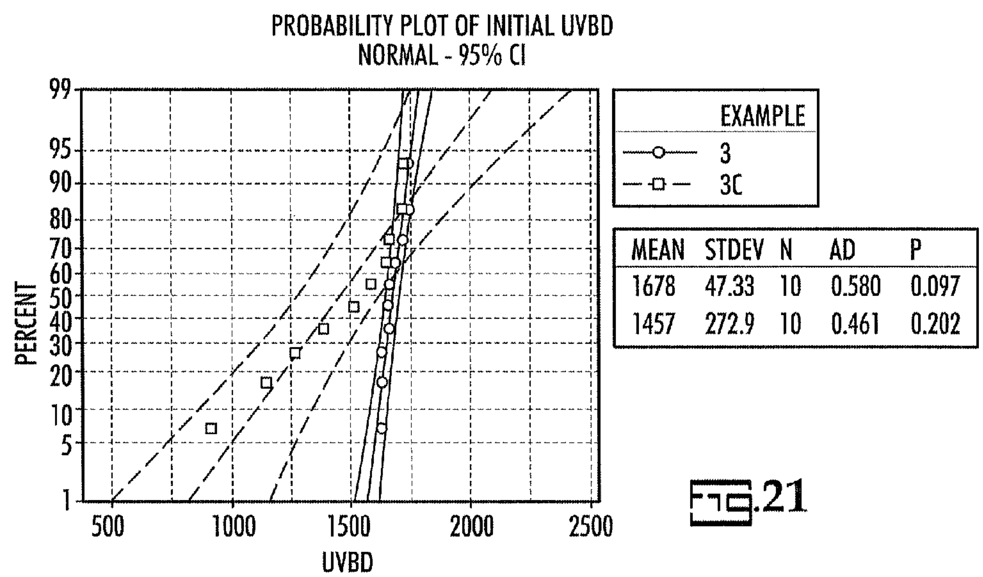
FIG. 21 is a plot illustrating an advantage of the present invention.

The selected capacitors with the internal air gap and the control parts were subjected to a voltage ramp of 300 volts/second up to voltage breakdown, followed by a second voltage ramp to breakdown at the same voltage ramp rate. The expected average UVBD for this capacitor design and material set is 95 to 105 volts/micron. As can be seen in Table 1, the average UVBD for the control group is 1678 volts which is in the expected range. Initial average UVBD of the test group 3C was slightly lower at 1457 volts and these distributions are shown in FIG. 21.

Figure 22:
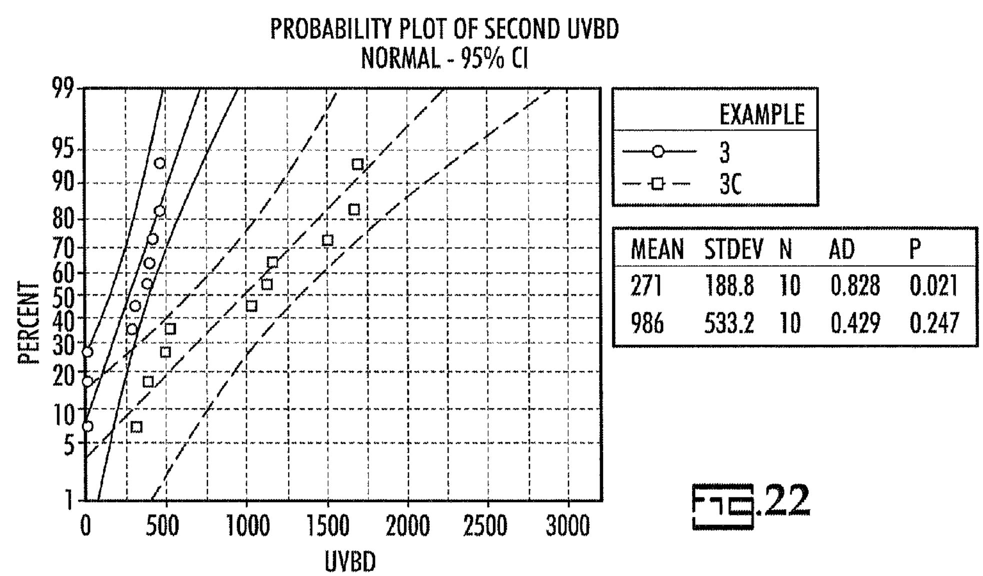
FIG. 22 is a plot illustrating an advantage of the present invention.
Figure 23:
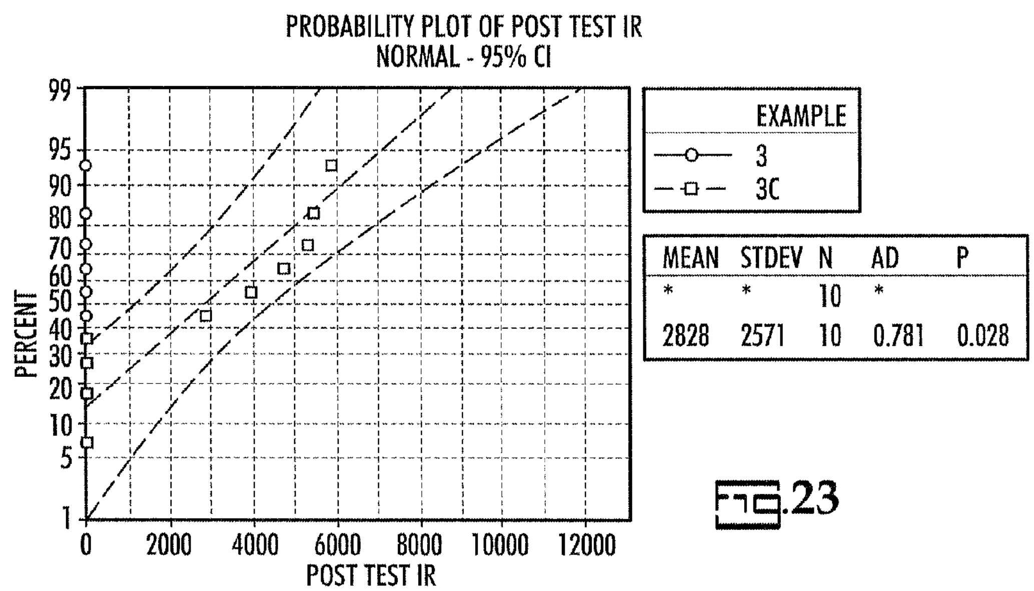
FIG. 23 is a plot illustrating an advantage of the present invention.

The second UVBD distributions are shown in FIG. 22. The average second UVBD for the control group was 271 volts, which was higher than that observed for the second UVBD of the X7R capacitors, Example 2, with similar electrode design as shown in Table 1. However, low post test insulation resistance for the control group, shown in Table 1 and FIG. 23, indicates that the capacitors experienced internal dielectric breakdown. The average second UVBD for the test group was 986 volts, which is significantly higher than the control group. The plot in FIG. 23 shows that six of the ten capacitors tested retained a good insulation resistance, >1G Ohm, and did not suffer internal dielectric breakdown. DPA examination of the internal construction of the test group after the application of UVBD voltage shows no evidence of dielectric breakdown in the area of the air gap.

Figure 24:
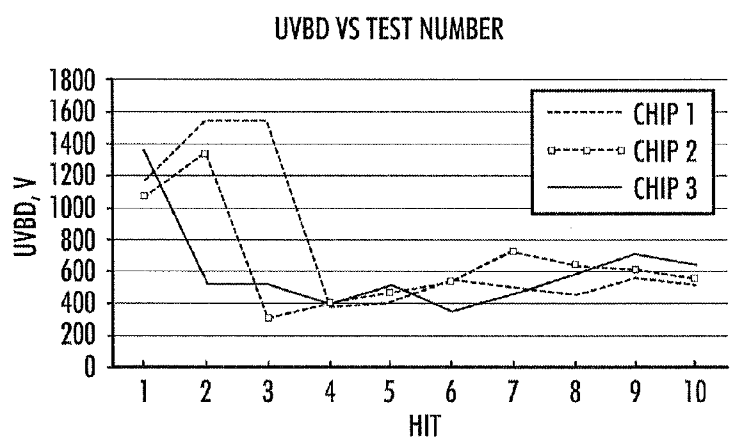
FIG. 24 is a plot illustrating an advantage of the present invention.

Ten capacitors from Example 3C were subjected to repeated cycles of UVBD voltage at a voltage ramp rate of 300 volts/second. Three of the capacitors survived 10 cycles of UVBD. The plot in FIG. 24 shows that after three to four cycles the UVBD voltage of these three capacitors settled into a range of 300 to 700 volts and maintained acceptable electrical characteristics as shown in Table 2.

TABLE 2

| Characteristics of selected samples from Example 3. | | | |
|---|---|---|---|
| Chip | Cap, nF | DF, % | IR, Gohm |
| 1 | 7.8 | .013 | 72 |
| 2 | 7.8 | .011 | 900 |
| 3 | 7.8 | .013 | 4400 |

Examples 4 & 4D

In Example 4 & 4D a base metal electrode (BME) multi layer ceramic capacitor (MLCC) with COG class materials in 0805 case size was constructed in the same manner as Examples 3 & 3C so that an air gap existed between two internal electrodes of opposite polarity in the case of Example 4D except that the length of the green capacitor was approximately 2.36 mm (0.093 inches) and the width was approximately 1.45 mm (0.057 inches).

The green capacitors were assembled using a dry layer build up process typical in the industry that incorporates screen printed internal electrodes. The electrodes were screen printed in a pattern containing an array of 7000 capacitors, and after the build-up process, singulated into individual green capacitors. The internal electrode was made such that the width of the electrode was approximately 1.04 mm (0.041 inches) and length was 2.06 mm (0.081 inches). The ends of the electrode were tapered, with the taper starting at approximately 0.41 mm (0.016 inches) from the end of the electrode and tapered down to a width of approximately 0.53 mm (0.021 inches). The total green tape thickness for each active layer was 29 microns and for each blank ceramic layer was 4.3 microns. The capacitors contained 30 total internal electrode layers. After stacking 38 blank ceramic layers and 14 electrode layers, the stacking process was paused and 10 blank ceramic layers were inserted into the stack followed by three printed layers containing the resin drop which was positioned such that the gap between the electrodes of each layer was in the approximate center of the capacitor. Ten blank ceramic layers were inserted into the capacitor stack followed by the remaining 13 electrode layers and 38 blank ceramic layers. The entire stack was subjected to a lamination pressure cycle sufficient to bond all layers together.

Figure 25:
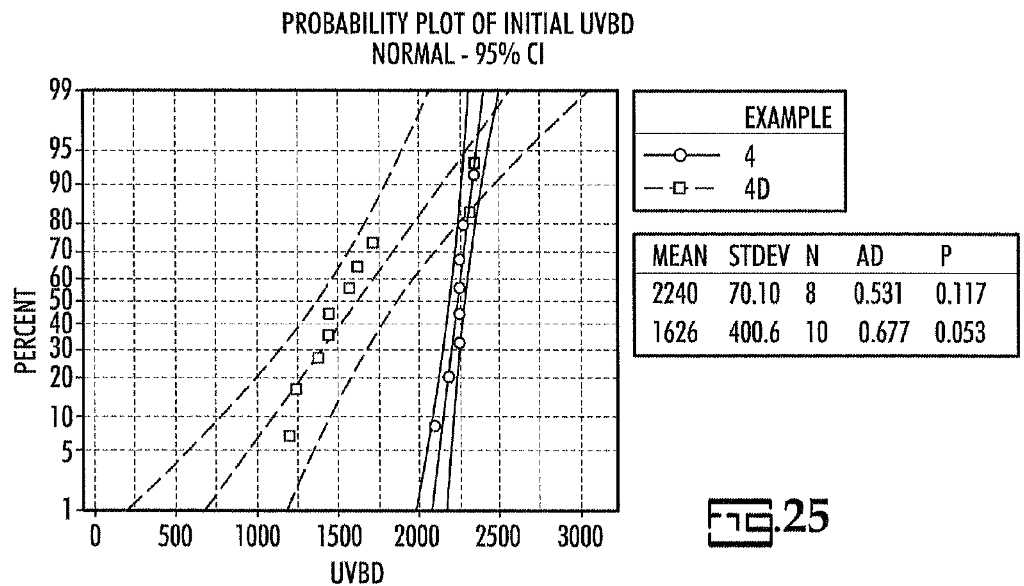
FIG. 25 is a plot illustrating an advantage of the present invention.
Figure 26:
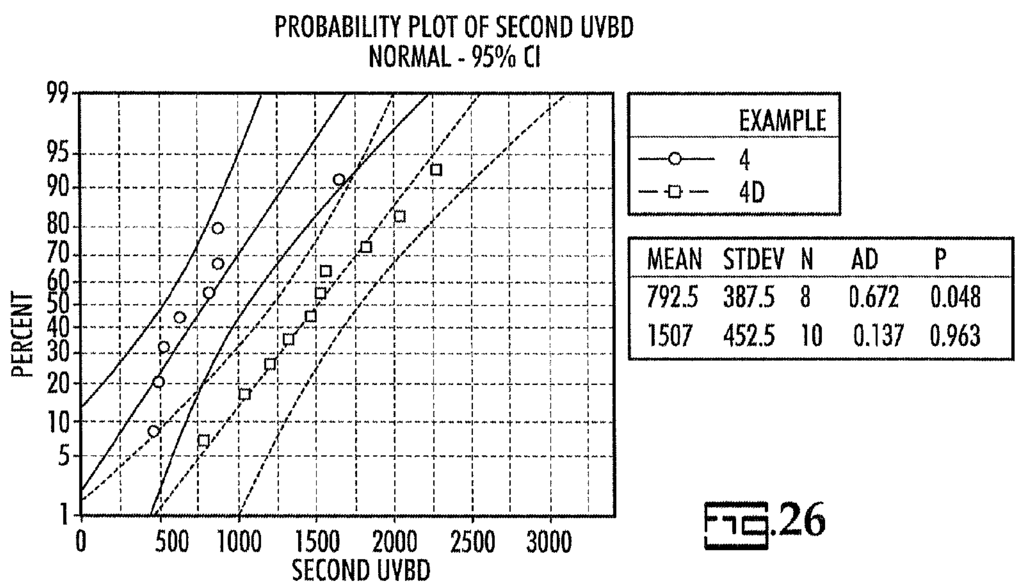
FIG. 26 is a plot illustrating an advantage of the present invention.

The selected capacitors with the internal air gap and the control parts were subjected to a voltage ramp of 300 volts/second up to voltage breakdown followed by a second voltage ramp to breakdown at the same voltage ramp rate. The expected average UVBD for this capacitor design and material set was 72 to 80 volts/micron. As can be seen in Table 1, the average UVBD for the control group was 2240 volts which is in the expected range. Initial UVBD of the test group was lower at 1626 volts. The initial UVDD distributions are shown in FIG. 25, the second UVBD distributions in FIG. 26 and the IR associated with these in FIG. 27.

Figure 28:
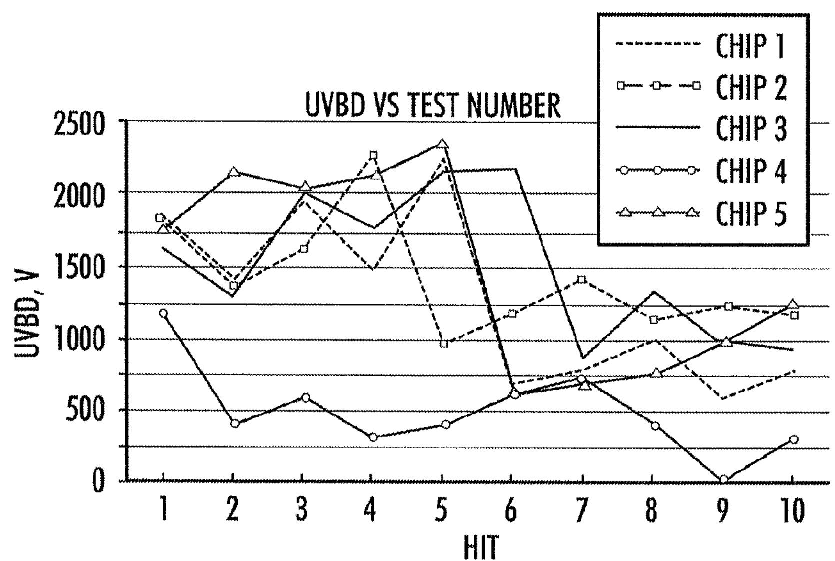
FIG. 28 is a plot illustrating an advantage of the present invention.

The average second UVBD for the control group was 793 volts which is <40% of the initial UVBD. Notably the control group post test insulation resistance was relatively high, averaging 4600 G Ohms. Internal DPA examination of the control group showed that an internal dielectric breakdown had occurred during UVBD, as shown in FIG. 28, but the failure was not catastrophic and appeared to allow the capacitor to accept some charge before arcing across the fracture in the dielectric between opposing electrode layers that resulted from the voltage breakdown.

Figure 27:
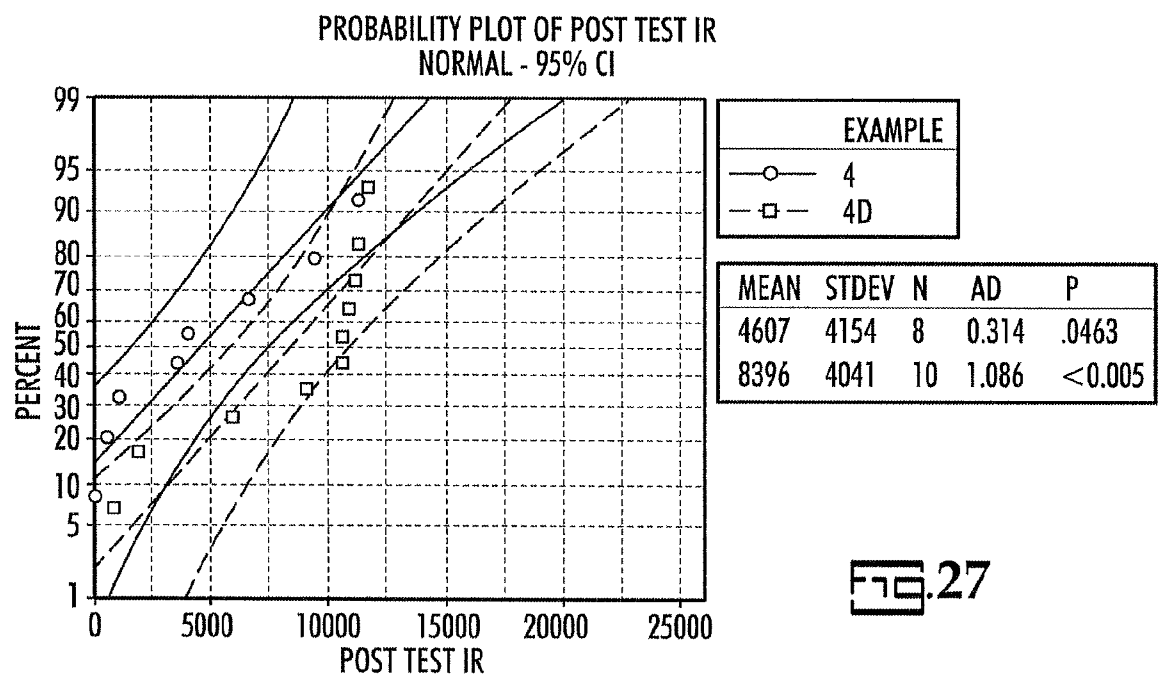
FIG. 27 is a plot illustrating an advantage of the present invention.

The average second UVBD for the test group was 1507 volts, which is similar to the initial UVBD of 1626 volts. The plot in FIG. 27 shows that all ten capacitors tested retained insulation resistance of >1G Ohm. DPA examination of the internal construction of the test group after the application of UVBD voltage showed no evidence of dielectric breakdown in the area of the air gap.

Five capacitors from Example 4D were subjected to repeated cycles of UVBD voltage at a voltage ramp rate of 300 volts/second. Four of the capacitors survived 10 cycles of UVBD. The plot in FIG. 28 showed that after five to seven cycles the UVBD voltage for these four capacitors settled into a range of 500 to 1400V.

Examples 5 & 5E

In Example 5 & 5E a base metal electrode (BME) multi layer ceramic capacitor (MLCC) with COG class materials in 1206 case size was constructed in the same manner as Example 4 & 4C so that an air gap existed between two internal electrodes of opposite polarity for 5E, except that the length of the green capacitor was approximately 3.53 mm (0.151 inches) and the width was approximately 2.05 mm (0.081 inches).

The green capacitors were assembled using a dry layer build up process typical in the industry that incorporated screen printed internal electrodes. The electrodes were screen printed in a pattern containing an array of 3000 capacitors that after the build-up process were singulated into individual green capacitors. The internal electrode was made such that the width of the electrode was approximately 1.55 mm (0.061 inches) and length was 3.53 mm (0.139 inches). The ends of the electrode were tapered, with the taper starting at approximately 0.81 mm (0.032 inches) from the end of the electrode and tapered down to a width of approximately 0.79 (0.031 inches). The total green tape thickness for each active layer was 30 microns and for each blank ceramic layer was 4.3 microns. The capacitors contained 39 total internal electrode layers. After stacking 45 blank ceramic layers and 18 electrode layers, the stacking process was paused and 12 blank ceramic layers were inserted into the stack followed by three printed layers containing the resin drop which was positioned such that the gap between the electrodes of each layer was in the approximate center of the capacitor. Twelve blank ceramic layers were inserted into the capacitor stack followed by the remaining 18 electrode layers and 45 blank ceramic layers. The entire stack was subjected to a lamination pressure cycle sufficient to bond all layers together.

Figure 29:
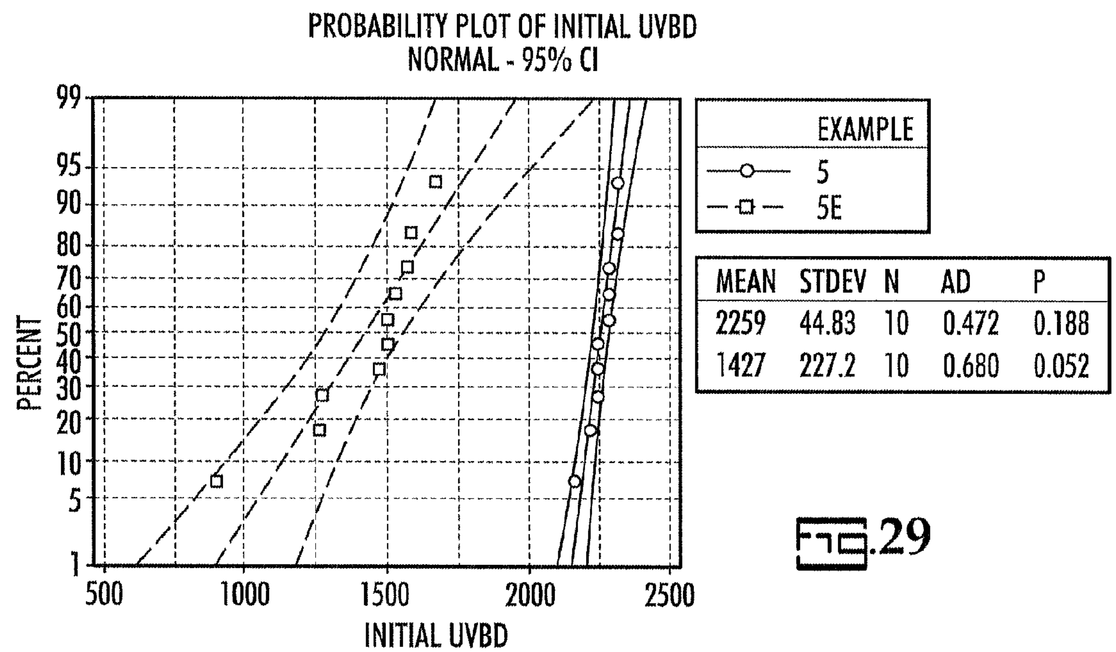
FIG. 29 is a plot illustrating an advantage of the present invention.

The selected capacitors with the internal air gap and the control parts were subjected to a voltage ramp of 300 volts/second up to voltage breakdown, followed by a second voltage ramp to breakdown at the same voltage ramp rate. The expected average UVBD for this capacitor design and material set was 72 to 80 volts/micron. As can be seen in Table 1, the average UVBD for the control group was 2259 volts which is in the expected range. Initial UVBD of the test group was lower at 1427 volts. These distributions are shown in FIG. 29.

Figure 30:
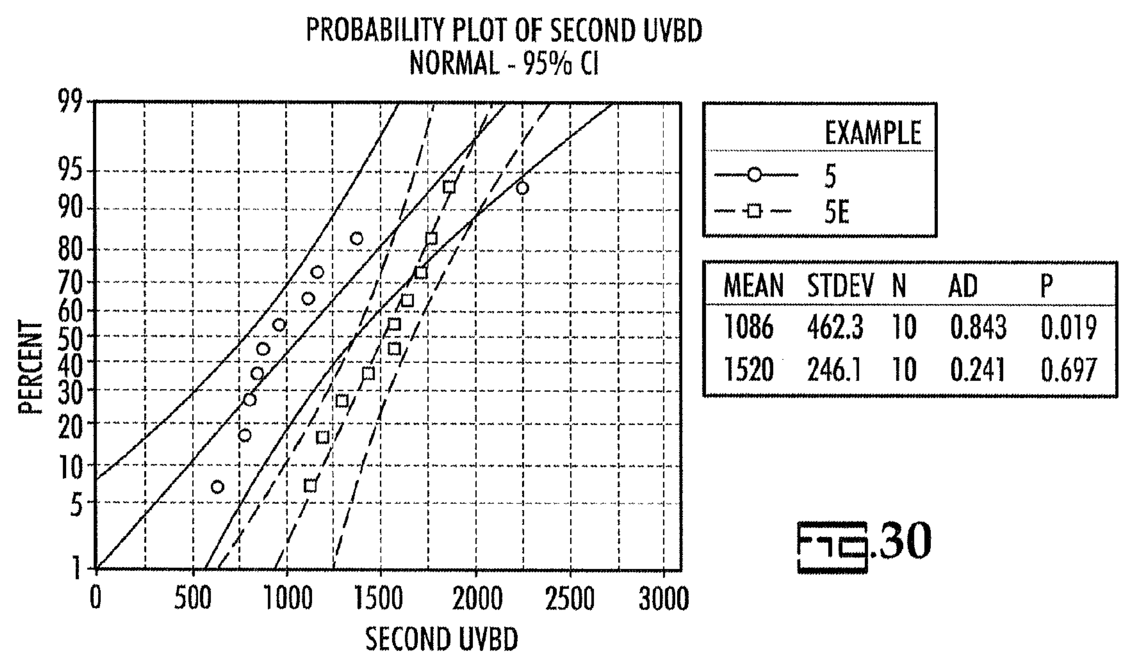
FIG. 30 is a plot illustrating an advantage of the present invention.
Figure 31:
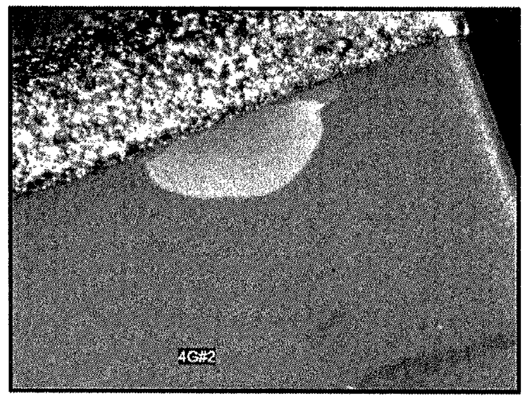
FIG. 31 is cross-sectional view of an embodiment of the invention.
Figure 32:
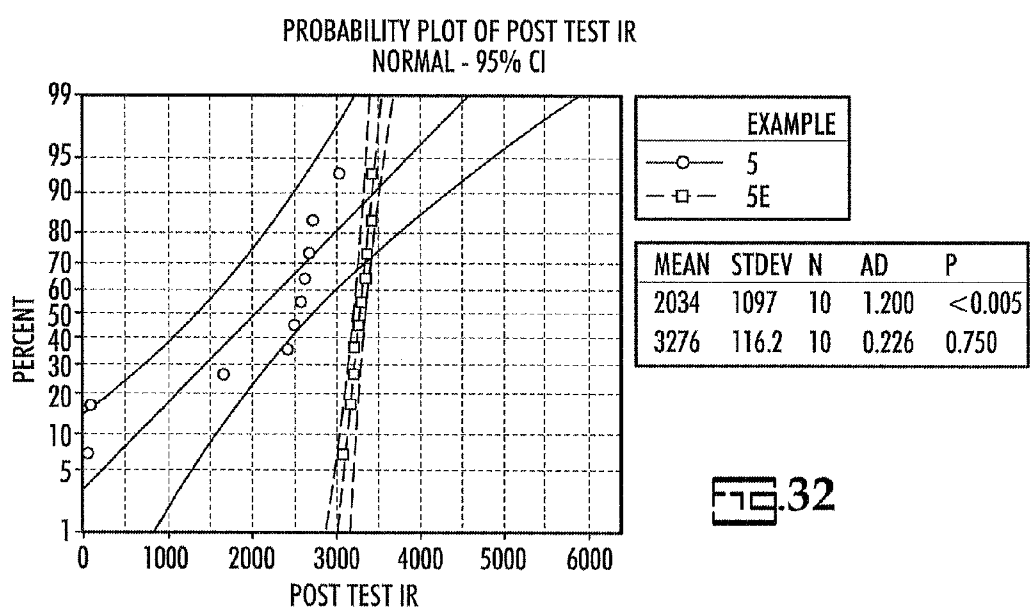
FIG. 32 is a plot illustrating an advantage of the present invention.

The average second UVBD for the control group was 1086 volts which is <50% of the initial UVBD, as seen in Table 1 & FIG. 30. Eight of ten capacitors in the control group exhibit relatively high post test insulation resistance, averaging 2034 Gohms, but an examination revealed evidence of dielectric breakdown as shown in FIGS. 31 and 2 capacitors had low IR as shown in FIG. 32.

Figure 33:
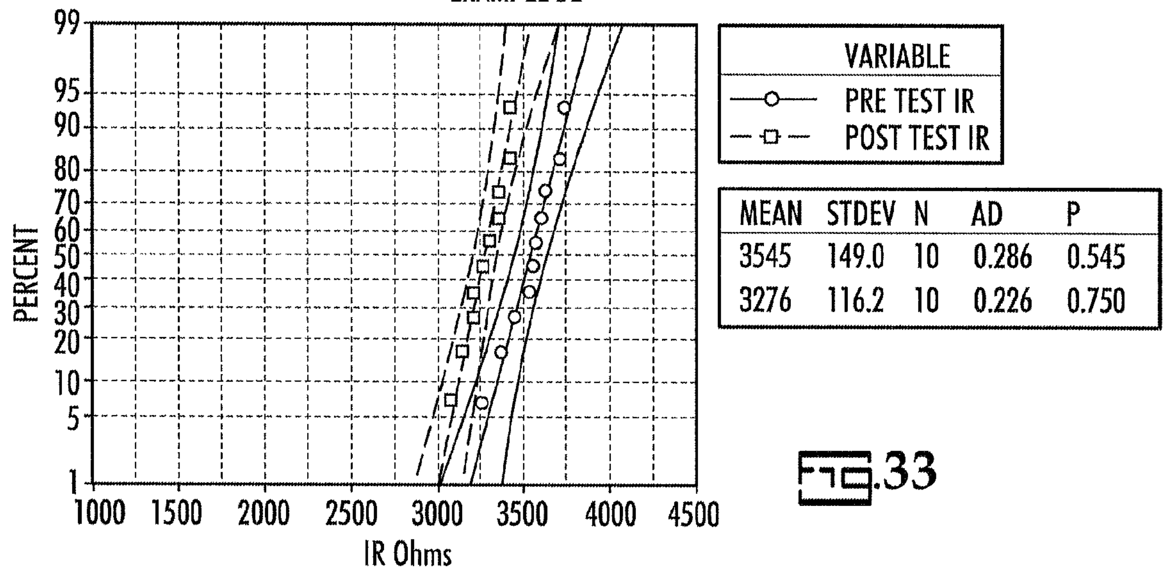
FIG. 33 is a plot illustrating an advantage of the present invention.

The average second UVBD for the test group was 1520 volts, which is similar to the initial UVBD of 1427 volts and the initial and second UVBD of Example 4D. The plot, in FIG. 33, shows that all ten capacitors tested retained good post test insulation resistance which is little changed from the pre test insulation resistance. DPA examination of the internal construction of the test group after the application of UVBD voltage showed no evidence of dielectric breakdown in the area of the air gap or in the active region of the capacitor.

Electrostatic Discharge ESD

Figure 34:
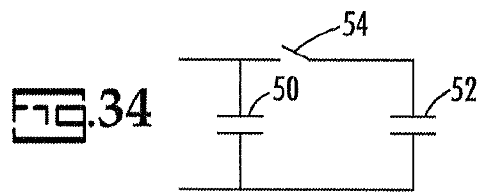
FIG. 34 is a schematic view illustrating ESD testing of a capacitor.

Ceramic capacitors have generally been very robust in withstanding electrostatic discharge voltages and are typically used to shield sensitive components from transient spikes in line voltage. Low capacitance values are preferred in this application to minimize the effects of the capacitor on the circuit. However, low capacitance values typically do not exhibit the highest ESD robustness. This is explained as follows. FIG. 34 shows a schematic that represents the ESD test circuit wherein the source capacitor is 50. An amount of electrical charge from the source capacitor charged to the ESD test voltage is discharged into the test capacitor, 52, when the switch, 54, is closed. Capacitance, dissipation factor and insulation resistance measurements, after the voltage discharge, are measured and compared to initial measures to indicate any degradation in the test capacitor.

In the ideal ESD testing case as charge flows from the source capacitor to the test capacitor, total charge is conserved and the resulting voltage decreases in amount proportional to the total capacitance as described in Equations A, B and C and test examples shown for a source RC network with a 150 pF capacitor and 2 kΩ resistor. This is consistent with the "Human Body Model" testing required for AEC Q200 testing (Ref: ISO10605:2008 & IEC61000-4-2).

$$Q_{initial}=\text{Cap}_{source}\times\text{Voltage}_{initial}$$

$$Q=150\text{ pF}\times 8\text{ kV}=1.2\times 10^{-6}\text{ Coulombs} \quad \text{Equation A}$$

$$Q_{final}=Q_{initial}$$

$$1.2\times 10^{-6}\text{ Coulombs}=1.2\times 10^{-6}\text{ Coulombs} \quad \text{Equation B}$$

$$\text{Voltage}_{final}=Q/(Cap_{source}+\text{Cap}_{cut})$$

$$V=1.2\times 10^{-6}/(150\text{ pF}+1000\text{ pF})*10^{-6}=1043\text{ V} \quad \text{Equation C}$$

If the final voltage exceeds the ultimate voltage breakdown (UVBD) of the capacitor, the capacitor may suffer catastrophic dielectric breakdown and electrical shorts. As these formulas show, lower cap values must withstand higher voltages to dissipate a given amount of charge from the source capacitor. This relationship limits the ability of circuit designers to downsize to smaller capacitors for this application because smaller capacitors have lower cap values at given voltage ratings.

Figure 35:
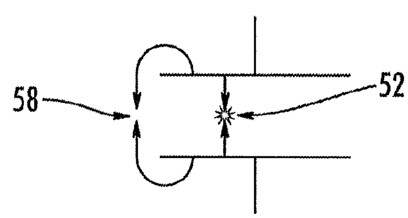
FIG. 35 is a schematic view illustrating breakdown mechanism of a capacitor.

If the UVBD of the capacitor is sufficiently high and the terminal to terminal spacing of the capacitor is small enough, the voltage may discharge across the external surface of the capacitor rather than through the capacitor as a dielectric breakdown. An illustration of these two paths is shown in FIG. 35 where 56 indicates discharge across the internal dielectric, which is destructive, and 58 indicates discharge across the external air gap which does not cause destruction. The tendency for a capacitor to arc across the terminals depends on several factors including the shape and position of internal electrodes, the type of dielectric and the environmental conditions. In addition if the circuit containing the capacitor is coated after assembly this can prohibit surface arcing.

Capacitors produced in Example 4 &4D and Example 5 & 5E were subjected to ESD testing and the results are shown in Table 3. The initial test voltage was 16 kilovolts. If an electrical failure was detected after exposure to the test voltage, the test voltage was reduced to 12 kilovolts and a new sample was tested at the lower voltage. If an electrical failure was not detected at 16 kilovolts, the test voltage was increased to 25 kilovolts and the testing continued. It can be seen in Table 3 that the capacitor test designs containing the internal air gap (4D and 5E) can survive higher ESD voltages than the standard capacitor designs (4 and 5) because the internal air, or spark, gap allows the excess voltage to discharge through the capacitor rather than on the exterior surface or by the internal dielectric breakdown mechanism.

TABLE 3

ESD Test Results

| | 220 pF | | 750 pF | |
|---|---|---|---|---|
| Voltage | 4D | 4 | 5E | 5 |
| 12 kV | — | — | — | 0/30 |
| 16 kV | 0/5 | 0/5 | 0/5 | 2/5 |
| 25 kV | 0/30 | 1/15 | 0/30 | — |

Figure 35A:
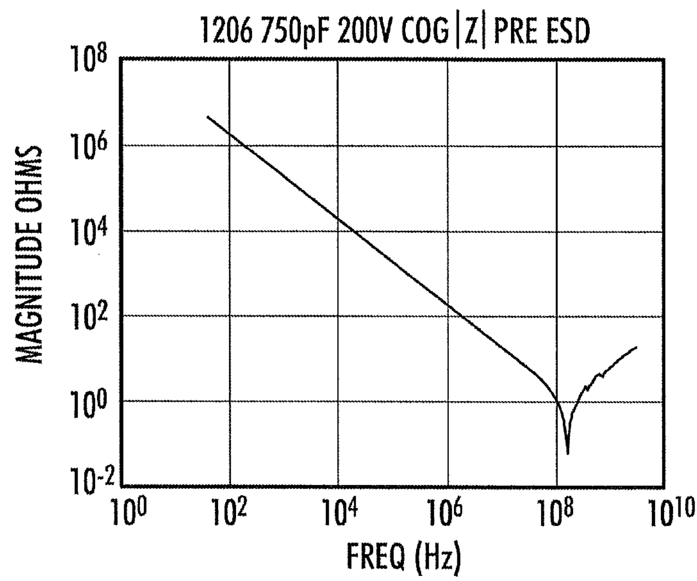
FIG. 35A is a plot illustrating an advantage of the present invention.
Figure 35B:
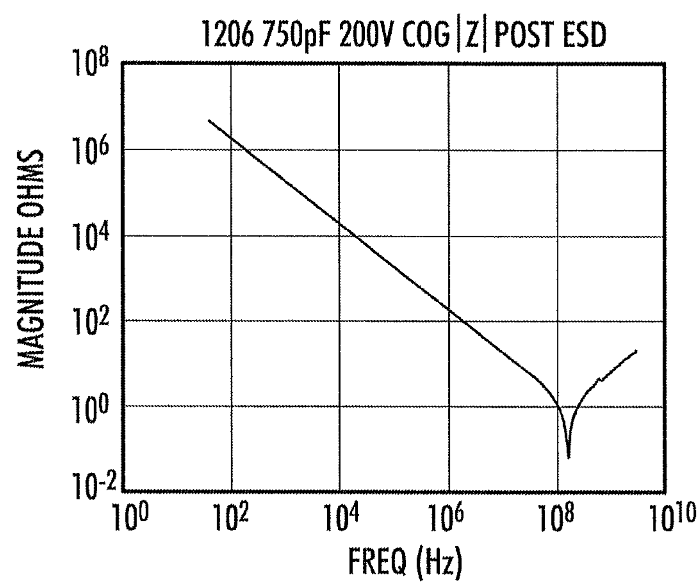
FIG. 35B is a plot illustrating an advantage of the present invention.

Samples 4D and 5E show no significant difference in capacitance, dissipation factor or insulation resistance after ESD testing at 25 kV. In the literature, IEEE Transactions 2009 "Electrostatic Discharge Analysis of Multi Layer Ceramic Capacitors", C Rostamzadeh, H. Dadgostar and F. Canavero, p 35-40 following ESD pulses of +/−15 kV some MLCC were shown to undergo permanent degradation as shown by lower impedance at low frequencies after this test compared to before the test. For this reason the impedance of a few MLCC from sample 5E were measured before and after ESD testing at 25 kV and their average impedances are shown below in FIGS. 35A and 35B respectively. There is no difference in impedance after 25 kV ESD testing in sample 5E, so we can conclude there is no degradation of the capacitors.

The invention has been described with reference to the preferred embodiments without limit thereto. One of skill in the art would realize additional improvements and embodiments which are not specifically described but are within the scope of the invention as set forth in the claims appended hereto.

The invention claimed is:

1. A electronic component comprising:

a capacitor comprising:

first planer internal electrodes in electrical contact with a first termination;

second planer internal electrodes in electrical contact with a second termination; and a dielectric between said first planer electrodes and said second planer internal electrodes;

at least one of:

an inductor comprising a conductive trace wherein said conductive trace is between said first termination and a third termination; and an overvoltage protection component comprising:

a third internal electrode contained within said dielectric and wherein said third internal electrode is electrically connected to said first termination;

a fourth internal electrode contained within said ceramic and electrically connected to a fourth termination; and a gap between the third internal electrode and said fourth internal electrode;

wherein said gap comprises a material selected from air, nitrogen, hydrogen and an inert gas.

2. The electronic component of claim 1 wherein said second termination and said fourth termination are a common termination.

3. The electronic component of claim 1 wherein said first termination and said third termination have a common polarity.

4. The electronic component of claim 1 wherein said gap has a closest separation distance which is less than a closest separation distance between said first termination and said second termination.

5. The electronic component of claim 1 further containing a second gap between said third internal electrode and said fourth internal electrode.

6. The electronic component of claim 1 further comprising at least one fifth electrode which is coplanar with said third internal electrode and said fourth internal electrode wherein a first fifth electrode is separated from said third internal electrode by a first gap and a first fifth electrode is separated from said fourth internal electrode by a second gap.

7. The electronic component of claim 1 where said first planer internal electrodes and said second planer internal electrodes comprises a material selected from a base metal and a precious metal.

8. The electronic component of claim 1 where at least one of said first termination, said second termination, said third termination or said fourth termination comprises a material selected from a base metal and a precious metal.

9. The electronic component of claim 8 wherein at least one of said first termination, said second termination, said third termination or said fourth termination is plated.

10. The electronic component of claim 1 wherein said dielectric comprises barium titanate or calcium zirconate and at least one of said first internal electrode or said second internal electrode comprises a base metal.

11. The electronic component of claim 1 wherein said conductive trace is on a surface of said electronic component.

12. The electronic component of claim 1 wherein said conductive trace is internal to said electronic component.

13. The electronic component of claim 1 further comprising a ferromagnetic or ferrimagnetic material coupled to said conductive trace.

14. The electronic component of claim 13 further comprising a non-conductive shell over at least said ferromagnetic or ferrimagnetic material.

15. The electronic component of claim 1 wherein said first planer internal electrodes and said second planer internal electrodes are in a common plane.

16. The electronic component of claim 15 further comprising a floating electrode between a first common plane and an adjacent second common plane.

17. The electronic component of claim 1 wherein said first planer internal electrodes and said second planer internal electrodes are interleaved.

18. The electronic component of claim 1 further comprising a second conductive trace.

19. The electronic component of claim 18 wherein said second conductive trace is on a surface of said electronic component.

20. The electronic component of claim 18 wherein said second conductive trace is between said first termination and a sixth termination and a second ferromagnetic or ferrimagnetic material coupled to said second conductive trace.

21. The electronic component of claim 2 comprising a fifth internal electrode connected to the third termination and a sixth internal electrode connected to a fifth termination such that a capacitor is formed between the fifth and sixth internal electrodes.

22. The electronic component of claim 21 that further comprises a seventh internal electrode connected to the third termination and an eighth internal electrode connected to the fifth termination and a gap between the seventh internal electrode and eighth internal electrode.

23. The electronic component of claim 1 further comprising a conductive shell with said electronic component encased in said conductive shell.

* * * * *